US011954969B2

(12) United States Patent
Crist et al.

(10) Patent No.: US 11,954,969 B2
(45) Date of Patent: Apr. 9, 2024

(54) GAMING ANALYTICS PLATFORM WITH PLAYER PERFORMANCE VARIANCE

(71) Applicant: POFFIT LLC, New York, NY (US)

(72) Inventors: Eliot Crist, New York, NY (US); Dave Connors, New York, NY (US); Todd J. Gross, New York, NY (US); Zijun Nie, New York, NY (US)

(73) Assignee: POFFIT LLC, New York, NY (US)

( * ) Notice: Subject to any disclaimer, the term of this patent is extended or adjusted under 35 U.S.C. 154(b) by 106 days.

(21) Appl. No.: 17/556,586

(22) Filed: Dec. 20, 2021

(65) Prior Publication Data

US 2022/0114857 A1 Apr. 14, 2022

Related U.S. Application Data

(62) Division of application No. 16/535,670, filed on Aug. 8, 2019, now Pat. No. 11,210,894.

(60) Provisional application No. 62/745,133, filed on Oct. 12, 2018, provisional application No. 62/716,170, filed on Aug. 8, 2018.

(51) Int. Cl.
*G06F 9/54* (2006.01)
*G07F 17/32* (2006.01)

(52) U.S. Cl.
CPC ........ *G07F 17/323* (2013.01); *G07F 17/3244* (2013.01); *G07F 17/3279* (2013.01); *G07F 17/3288* (2013.01)

(58) Field of Classification Search
CPC ............................... A63F 13/46; A63F 13/828
See application file for complete search history.

(56) References Cited

U.S. PATENT DOCUMENTS

2013/0013642 A1* 1/2013 Klein .................. H04L 67/1097
707/E17.055
2013/0167162 A1* 6/2013 Fernandez ............ A63F 13/828
719/328
2015/0065214 A1 3/2015 Olson et al.
2016/0263483 A1* 9/2016 Le ......................... A63F 13/352
2017/0319970 A1* 11/2017 Thorman .............. A63F 13/828

OTHER PUBLICATIONS

International Search Report and Written Opinion for Application No. PCT/US2019/045666, dated Dec. 11, 2019.
International Preliminary Report on Patentability issued in PCT Patent Application No. PCT/US2019/045666 dated Feb. 9, 2021.

* cited by examiner

*Primary Examiner* — Lawrence S Galka
(74) *Attorney, Agent, or Firm* — MARSHALL, GERSTEIN & BORUN LLP

(57) ABSTRACT

Techniques for an analytics platform associated with gaming are described. According to certain aspects, systems and methods include ingesting data from a plurality of data sources into a database to support one or more tools. The tools may be configured to cause the analytics platform generate a temporary data table used to populate user interfaces associated with the tools. Additionally, systems and methods may include obtaining user-directed performance levels for one or more players. In response, the analytics platform executes a modeling algorithm based on the user-directed performances levels to generate a user-adjusted event outcome.

16 Claims, 16 Drawing Sheets

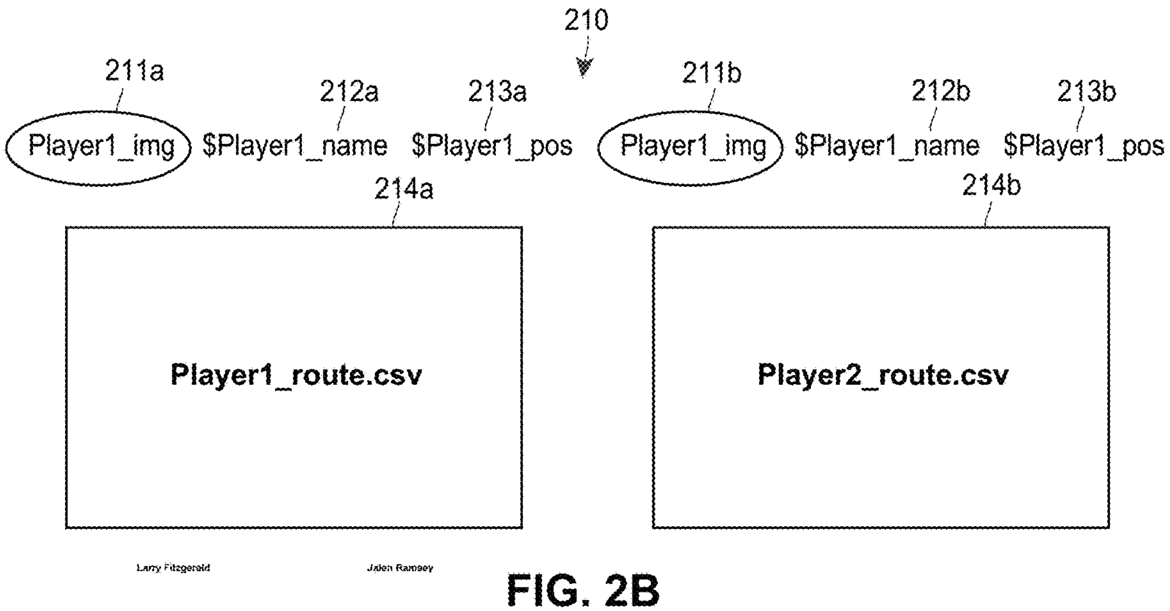
FIG. 2B
230
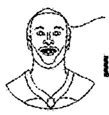
232a 233a
Larry Fitzgerald (WR)
234a
232b 233b
Jalen Ramsey (CB)
234b
| | Trg | Rec | Int | TD | YPT | aDot | Rating | | Trg | Rec | Int | TD | YPT | aDot | Rating |
|---|---|---|---|---|---|---|---|---|---|---|---|---|---|---|---|
| Bubble Screen | 25 | 22 | 0 | 0 | 3.6 | -2.0 | 81.5 | Bubble Screen | 25 | 22 | 0 | 0 | 3.6 | -2.0 | 81.5 |
| Curl | 22 | 14 | 0 | 0 | 5.9 | 7.5 | 79.5 | Curl | 22 | 14 | 0 | 0 | 5.9 | 7.5 | 79.5 |
| Out | 18 | 12 | 0 | 0 | 8.9 | 9.3 | 94.9 | Out | 18 | 12 | 0 | 0 | 8.9 | 9.3 | 94.9 |
| Post | 16 | 8 | 0 | 2 | 8.9 | 13.0 | 120.3 | Post | 16 | 8 | 0 | 2 | 8.9 | 13.0 | 120.3 |
| Slant | 16 | 11 | 0 | 0 | 7.1 | 5.3 | 89.1 | Slant | 16 | 11 | 0 | 0 | 7.1 | 5.3 | 89.1 |
| Go Route | 14 | 7 | 0 | 1 | 10.8 | 19.0 | 112.5 | Go Route | 14 | 7 | 0 | 1 | 10.8 | 19.0 | 112.5 |
| Drag | 9 | 8 | 0 | 0 | 5.4 | 2.7 | 89.4 | Drag | 9 | 8 | 0 | 0 | 5.4 | 2.7 | 89.4 |
| Flat | 9 | 7 | 0 | 0 | 2.9 | -0.7 | 76.2 | Flat | 9 | 7 | 0 | 0 | 2.9 | -0.7 | 76.2 |
| Corner | 6 | 3 | 1 | 1 | 13.7 | 20.8 | 95.8 | Corner | 6 | 3 | 1 | 1 | 13.7 | 20.8 | 95.8 |
| Cross | 6 | 5 | 0 | 0 | 14.2 | 13.5 | 118.8 | Cross | 6 | 5 | 0 | 0 | 14.2 | 13.5 | 118.8 |
| Dig | 6 | 3 | 0 | 0 | 2.8 | 9.2 | 56.2 | Dig | 6 | 3 | 0 | 0 | 2.8 | 9.2 | 56.2 |
| Fade | 6 | 3 | 0 | 2 | 9.2 | 17.3 | 121.5 | Fade | 6 | 3 | 0 | 2 | 9.2 | 17.3 | 121.5 |
| Comeback | 3 | 2 | 0 | 0 | 7.7 | 10.0 | 89.6 | Comeback | 3 | 2 | 0 | 0 | 7.7 | 10.0 | 89.6 |
| Wheel | 3 | 2 | 0 | 0 | 9.3 | 13.7 | 96.5 | Wheel | 3 | 2 | 0 | 0 | 9.3 | 13.7 | 96.5 |
| Other | 2 | 2 | 0 | 0 | 15.0 | 9.5 | 118.8 | Other | 2 | 2 | 0 | 0 | 15.0 | 9.5 | 118.8 |
| **Overall** | **161** | **109** | **1** | **6** | **7.3** | **8.2** | **98.9** | **Overall** | **161** | **109** | **1** | **6** | **7.3** | **8.2** | **98.9** |
FIG. 2C

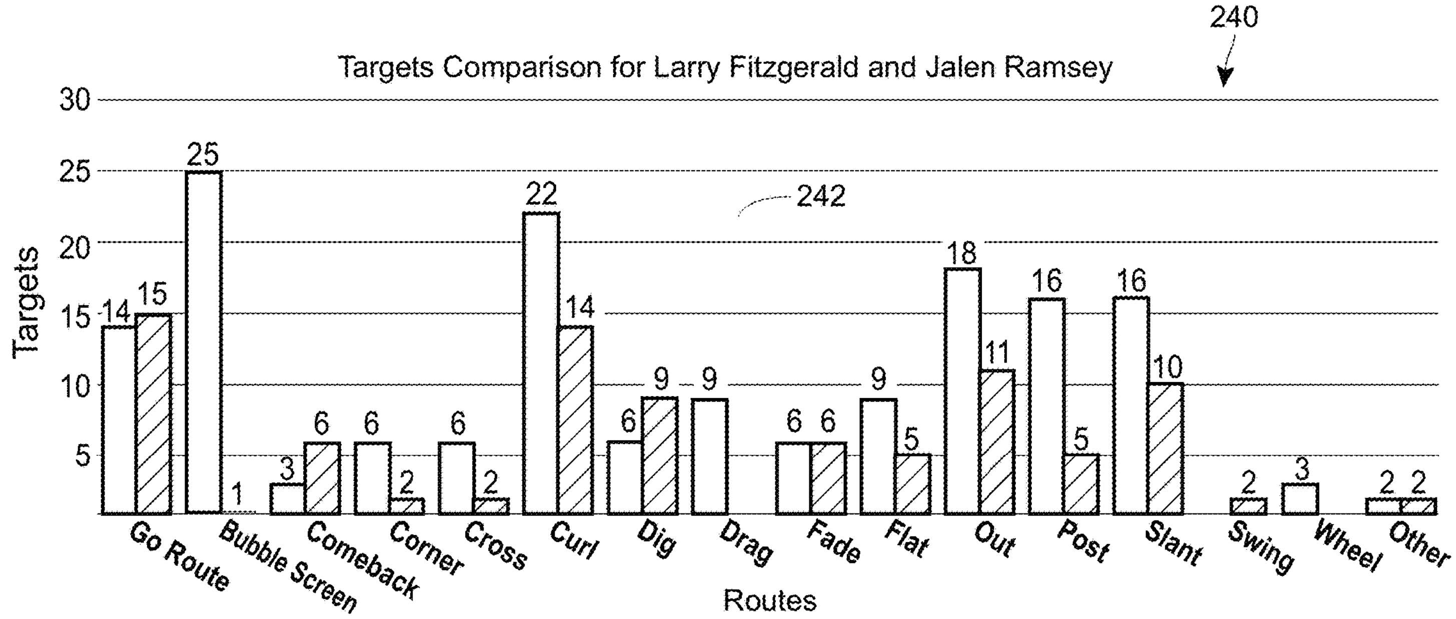
FIG. 2D
250
Larry Fitzgerald (WR) 252a
| | %faced | Trg | Rec | Int | TD | YPT | aDot | Rating |
|---|---|---|---|---|---|---|---|---|
| Zone | 41.4% | 66 | 51 | 1 | 2 | 10.5 | 10.3 | 113.9 |
| Man | 26.5% | 43 | 24 | 0 | 3 | 6.8 | 9.3 | 100.1 |
| Press-Jam | 8.0% | 13 | 3 | 0 | 1 | 3.8 | 14.5 | 68.8 |
| Press | 4.3% | 7 | 4 | 0 | 0 | 4.9 | 12.9 | 69.9 |
Jalen Ramsey (CB) 252b
| | %in cov | Trg | Rec | Int | TD | YPT | aDot | Rating |
|---|---|---|---|---|---|---|---|---|
| Zone | 42.7% | 38 | 20 | 3 | | 6.6 | 12.7 | 40.6 |
| Man | 37.1% | 33 | 17 | 2 | | 9.1 | 15.3 | 67.7 |
| Press | 12.4% | 11 | 4 | 1 | | 7.4 | 17.7 | 55.5 |
| Press-Jam | 7.9% | 7 | 3 | 0 | | 3.4 | 12.7 | 52.1 |
FIG. 2E

320

ADVANCED METRICS (PER GAME)

SCORING RULES PROVIDER

◉ DRAFT KINGS ○ FUNDUEL ○ NFL.com 322

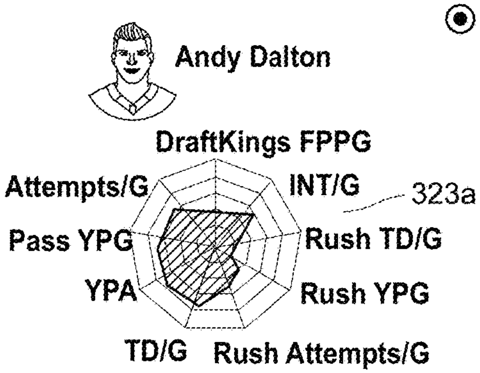

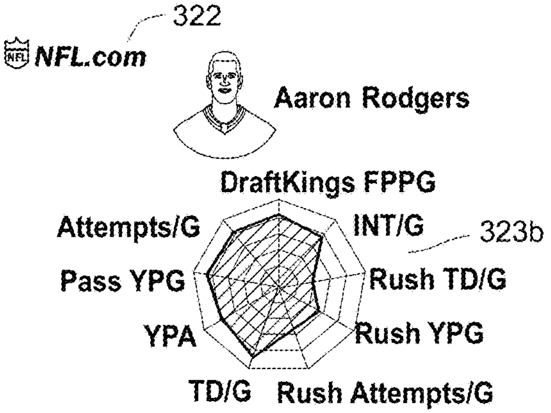

Note: Each axis in the spider chart represents percentile of selected player among all players in the same position.

324a

| Metric | Actual STATS | Percentile |
|---|---|---|
| DraftKings FPPG | 14.3 | 56.0% |
| Passing Attempts (Attempts/G) | 31 | 81.0% |
| Passing Yards (Pass YPG) | 206.81 | 72.0% |
| Yards per Attempts (YPA) | 6.67 | 67.0% |
| Passing TDs (TD/G) | 1.56 | 58.0% |
| Rushing Attempts (Rush Attempts/G) | 2.38 | 27.0% |
| Rushing Yards (Rush YPG) | 6.19 | 19.0% |
| Rushing TDs (Rush TD/G) | 0 | 0.0% |
| Interceptions (INT/G) | 0.75 | 72.1% |

324b

| Metric | Actual STATS | Percentile |
|---|---|---|
| DraftKings FPPG | 21.37 | 81.0% |
| Passing Attempts (Attempts/G) | 34 | 89.0% |
| Passing Yards (Pass YPG) | 239.29 | 84.0% |
| Yards per Attempts (YPA) | 7.04 | 70.0% |
| Passing TDs (TD/G) | 2.29 | 85.0% |
| Rushing Attempts (Rush Attempts/G) | 3.43 | 39.0% |
| Rushing Yards (Rush YPG) | 18 | 42.0% |
| Rushing TDs (Rush TD/G) | 0 | 0.0% |
| Interceptions (INT/G) | 0.86 | 66.3% |

FIG. 3B

PHYSICAL MEASUREMENT

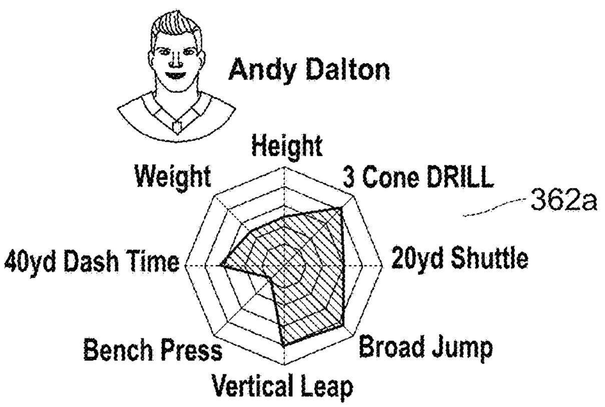

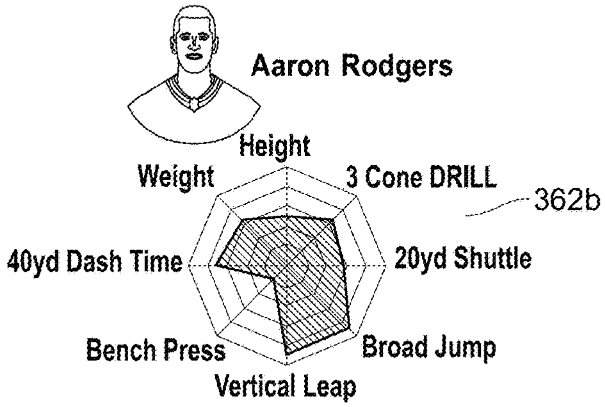

Note: Each axis in the spider chart represents percentile of selected player among all players in the same position.

| Metric | Actual STATS | Percentile |
|---|---|---|
| Height | 6.2 | 37.5% |
| Weight | 215 | 36.2% |
| 40yd Dash Time | 4.82 | 54.1% |
| Bench Press | 0 | 0.0% |
| Vertical Leap | 29.5 | 76.6% |
| Broad Jump | 106 | 84.1% |
| 20yd Shuttle | 4.27 | 53.8% |
| 3 Cone DRILL | 6.93 | 78.7% |

364a

| Metric | Actual STATS | Percentile |
|---|---|---|
| Height | 6.2 | 37.5% |
| Weight | 225 | 57.4% |
| 40yd Dash Time | 4.71 | 67.1% |
| Bench Press | 0 | 0.0% |
| Vertical Leap | 34.5 | 89.6% |
| Broad Jump | 110 | 87.3% |
| 20yd Shuttle | 4.32 | 47.5% |
| 3 Cone DRILL | 7.12 | 58.5% |

364b

FIG. 3F

400

PLAYER TO BE REMOVED

SELECT OFF/DEF PLAYERS

Offensive | Defensive 402

SELECT YEAR

2017 | 2016 403

ARI ▼ 404

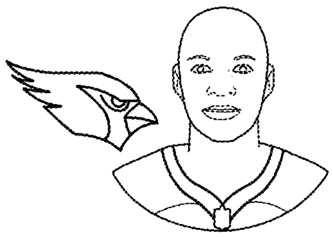

Adrian Peterson ▼ 405

TEAM PERFORMANCE

407

| Statistic | In Split | Out of Split |
|---|---|---|
| Pass % | 40.2% | 65.4% |
| Run% | 58.8% | 34.6% |
| Run Success rate | 35.0% | 32.7% |
| Pass Success rate | 44.8% | 40.8% |
| Explosive Run % | 4.2% | 1.5% |
| Explosive Pass % | 18.8% | 16.3% |
| Turnover % | 1.7% | 1.7% |
| Sack % | 3.0% | 8.9% |
| Yards Per Carry | 3.4 | 3.38 |
| Yards Per Pass Attempt | 8.34 | 6.99 |
| Snaps | 243 | 818 |

The above table shows:
Team ARI's performance
with Adrian Peterson (In-Split)
and without him (Out-of-Split)

FIG. 4A

420

INDIVIDUAL IMPACT

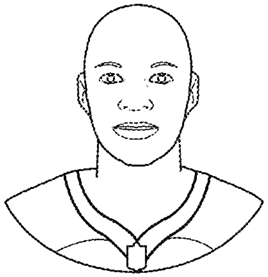

SELECT POSITION

QB RB WR TE

422

In Split (243 Snaps)

| Player | Trg% | LWR% | RWR% | SWR% | Snap% | aDot | RZ Trg% | TD Rate |
|---|---|---|---|---|---|---|---|---|
| Larry Fitzgerald | 32.3% | 24.4% | 22.2% | 34.2% | 95.1% | 8.94 | 22.2% | 6.5% |
| J.J. Nelson | 9.4% | 43.5% | 40.6% | 14.5% | 27.2% | 22.89 | 0.0% | 0.0% |
| John Brown | 6.2% | 39.7% | 44.1% | 11.8% | 53.5% | 18.83 | 0.0% | 0.0% |
| Jaron Brown | 4.2% | 25.8% | 35.5% | 17.7% | 48.8% | 23.50 | 0.0% | 25.0% |
| Chad Willams | 3.1% | 36.8% | 31.6% | 21.1% | 7.5% | 7.67 | 0.0% | 0.0% |
| Brittan Golden | 0.0% | 25.0% | 0.0% | 62.5% | 3.1% | 0.00 | 0.0% | 0.0% |

422

Out of Split (818 Snaps)

| Player | Trg% | LWR% | RWR% | SWR% | Snap% | aDot | RZ Trg% | TD Rate |
|---|---|---|---|---|---|---|---|---|
| Larry Fitzgerald | 26.1% | 16.6% | 21.9% | 54.0% | 63.8% | 8.05 | 28.1% | 3.1% |
| John Brown | 12.9% | 30.0% | 24.6% | 19.8% | 67.0% | 14.92 | 17.2% | 4.6% |
| J.J. Nelson | 10.4% | 39.0% | 32.8% | 22.2% | 36.6% | 17.44 | 4.7% | 3.8% |
| Jaron Brown | 9.8% | 22.0% | 33.3% | 41.4% | 26.5% | 14.94 | 9.4% | 6.1% |
| Brittan Golden | 1.8% | 2.8% | 1.4% | 16.6% | 22.8% | 6.44 | 3.1% | 0.0% |
| Chad Willams | 0.8% | 26.7% | 37.2% | 26.7% | 6.8% | 15.00 | 0.0% | 0.0% |

424

FIG. 4B

GAMING ANALYTICS PLATFORM WITH PLAYER PERFORMANCE VARIANCE

CROSS-REFERENCE TO RELATED APPLICATIONS

This application is a divisional application which claims priority of U.S. patent application Ser. No. 16/535,670, filed Aug. 8, 2019, which claims priority benefit of U.S. Provisional Application No. 62/716,170, filed Aug. 8, 2018, and U.S. Provisional Application No. 62/745,133, filed Oct. 12, 2018, the disclosure of each of which are incorporated by reference in their entirety.

FIELD OF THE DISCLOSURE

The present application relates generally to an analytics platform and, more particularly, to an analytics platform capable of analyzing data to facilitate improved gaming selections.

BACKGROUND

Fantasy sports games generally involves participants selecting a team or lineup of players that accrues fantasy points based on the performance of the selected players. For example, in fantasy football, a player may accrue points based on rushing yards, receiving yards, touchdowns, field goals, and so on. In the "daily" variant of fantasy sports games, each participant selects a team of players from the pool of players involved in a game on a particular day. The team that accrues the most points is the winner of the game.

When determining the optimal team of players to select, there are innumerous factors for participants to consider. For example, some factors may include a player's past performance, the player's opponent's historical performance, the weather at the game site, and so on. While some tools exist that project a player's expected performance and apply the particular game's scoring system to predict a fantasy point total, it is difficult to determine most appropriate set of data on which to base these projections. Moreover, for rookies or other players with less experience, some factors may have insufficient sample sizes on which to meaningfully base conventional projections. As a result, conventional fantasy point projections are not reliable as a sole factor in selecting an optimal team.

Therefore, there is a need for an analytics platform that supports additional types of analyses to avoid overreliance on these conventional metrics.

SUMMARY

To support the unconventional analytical techniques described herein, systems and methods include ingesting, by an analytics platform, data from a plurality of data sources into a database; detecting, by the analytics platform, an instruction to launch a tool supported by the analytics platform; generating, by the analytics platform, a user interface template for presenting a user interface associated with the tool, the user interface template including an indication of a data table to present via the user interface; based on an analysis of data stored in the database, generating, by the analytics platform, a temporary data table that includes data values indicated by the user interface template; populating, by the analytics platform, the user interface template with the data values included in the temporary data table to produce the user interface associated with the tool; and causing, by the analytics platform, a client device to present the populated user interface associated with the tool.

In another embodiment, systems and methods include obtaining, via a user interface presented by an analytics platform, an indication of a user-directed performance level for a player participating in an event; obtaining, by the analytics platform, an outcome of the event associated with a wager; calculating, by the analytics platform, a predicted player output based on the player performing at the user-directed performance level; executing, by the analytics platform, a modeling algorithm configured to convert the outcome associated with the wager and the predicted player output into a default event outcome and a user-adjusted event outcome; and presenting, via the user interface presented by the analytics platform, the default event outcome and the user-adjusted event outcome.

BRIEF DESCRIPTION OF THE DRAWINGS

FIG. 2B is an example user interface template generated by a UI application as part of a receiver-defender matchup analysis tool of the analytics platform, the user interface for comparing the historical performance of a receiver when running a plurality of routes and a defender when defending against the plurality of routes;

FIG. 2C is an example user interface filled in by an update application as part of a receiver-defender matchup analysis tool of the analytics platform, the user interface for comparing the historical performance of a receiver when running a plurality of routes and a defender when defending against the plurality of routes;

FIG. 2D is an example user interface presented by a client device interacting with a receiver-defender matchup analysis tool of the analytics platform, the user interface for displaying a graphical comparison of historical performance for the receiver and defender with respect to a plurality of routes;

FIG. 2E is an example user interface presented by a client device interacting with a receiver-defender matchup analysis tool of the analytics platform, the user interface for comparing the historical performance of a receiver when facing a plurality of types of defenses and a defender when performing the plurality of types of defenses;

FIG. 3B is an example user interface presented by a client device interacting with a head-to-head analysis tool of the analytics platform, the user interface for displaying past performance of the two players;

FIG. 3F is an example user interface presented by a client device interacting with a head-to-head analysis tool of the analytics platform, the user interface for comparing physical measurements of the two players;

FIG. 4A is an example user interface presented by a client device interacting with an injury analysis tool of the analytics platform, the user interface for viewing the impact on team performance when a selected player is injured;

FIG. 4B is an example user interface presented by a client device interacting with an injury analysis tool of the analytics platform, the user interface for viewing the impact on teammate performance when the selected player is injured;

DETAILED DESCRIPTION

As it is used generally herein, the term "gaming" refers to a competition based on the performance of particular players in a real life competition (e.g., a sporting event). One common type of gaming is a fantasy sports game. Generally, fantasy sports games tend to fall into either a "season-long" variant where a participant has control over the team across the course of a league's season or a "daily" variant where the participant selects a new team each day. Of course, other fantasy sports game variants exist and are envisioned by the present disclosure. Another form of gaming includes sports wagering where participants place bets on various events that occur throughout a game, such as the outcome, a team achieving a threshold number of points, a player hitting a home run, and so on. While some of the tools described herein may be more suitable for one particular gaming format, some embodiments may nonetheless provide the tools to support other gaming formats.

Figure 1A:
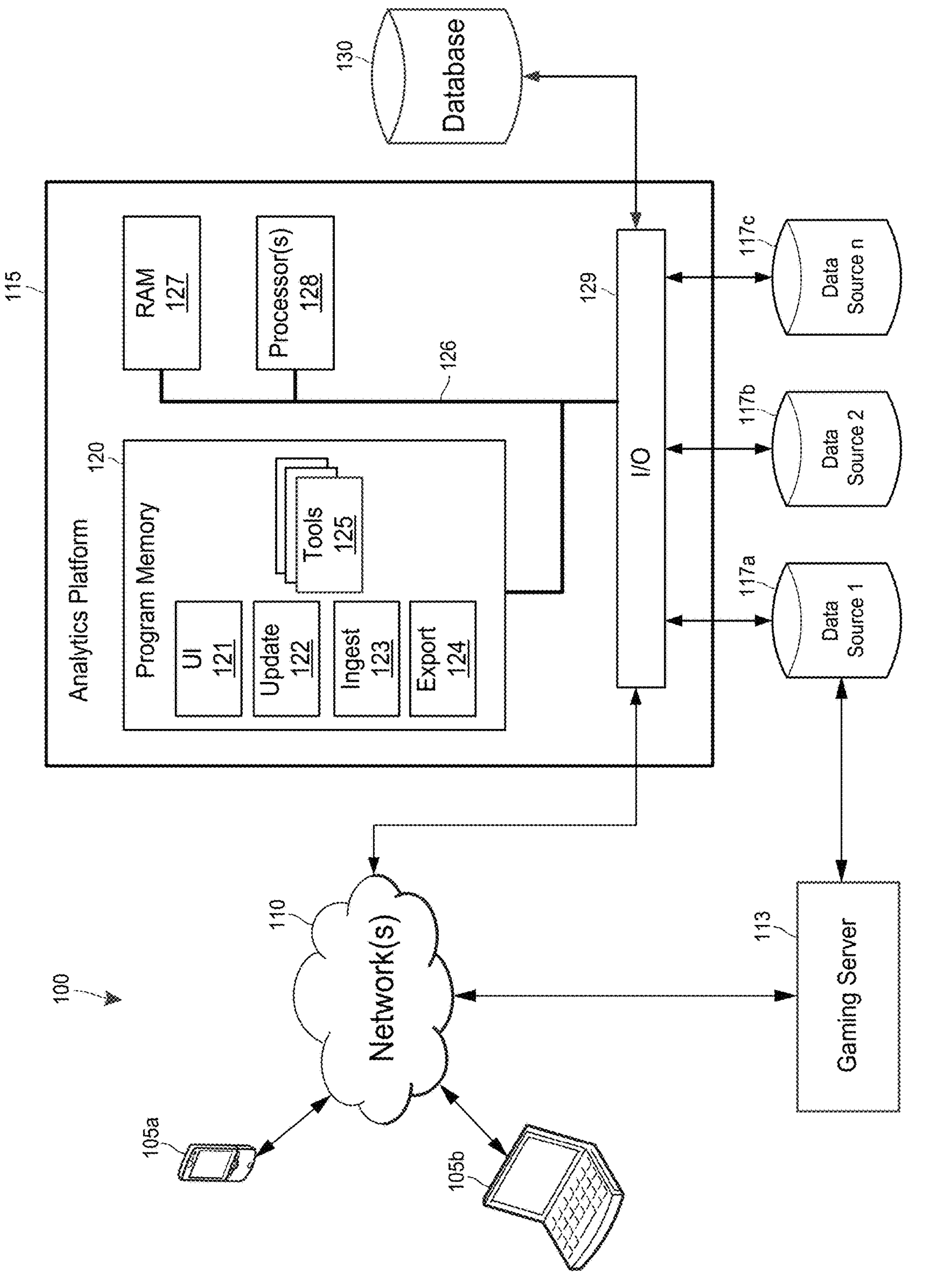
FIGS. 1A and 1B is a block diagram of an example environment that includes an analytics platform configured to execute the analytics techniques described herein.
Figure 1B:
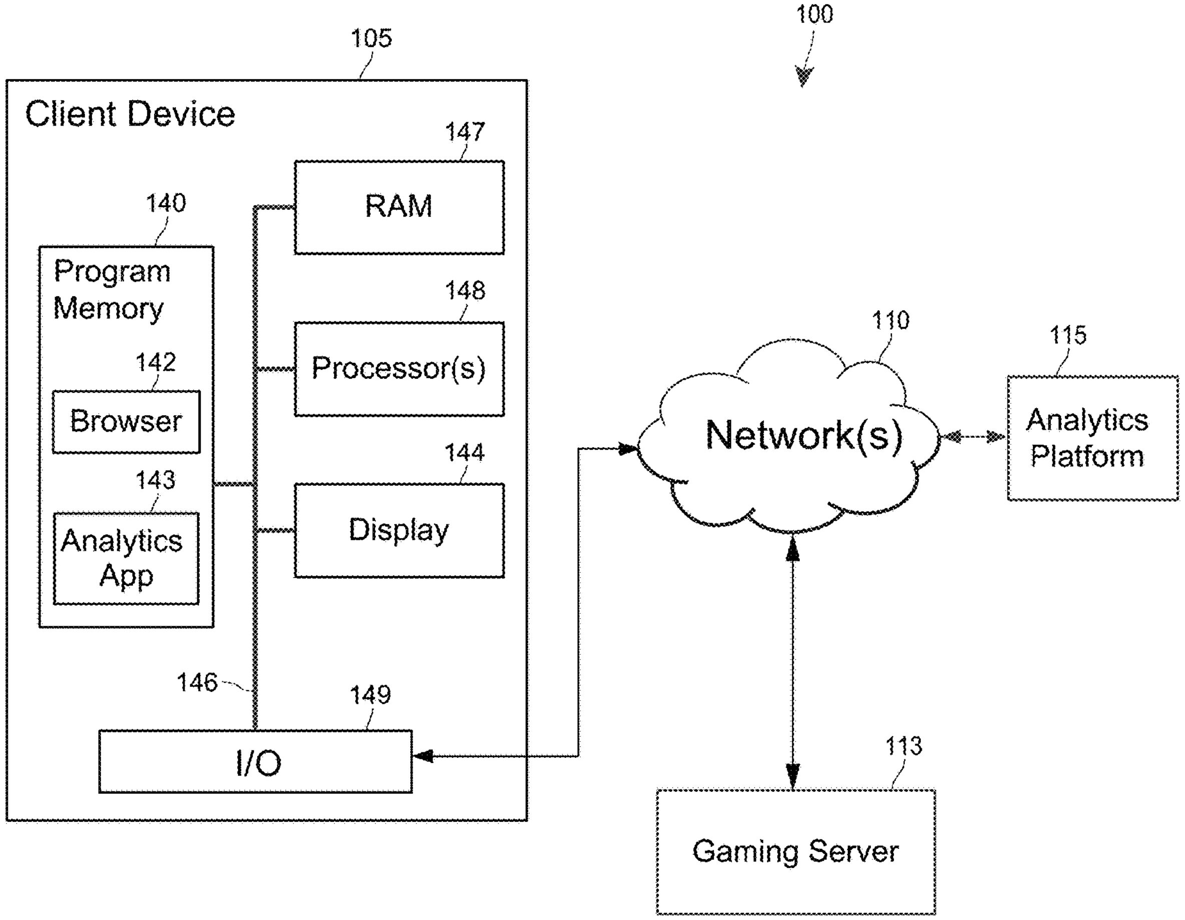

Referring now to FIGS. 1A and 1B, illustrated is an example environment 100 that includes a gaming server 113 configured to support a gaming competition. In some scenarios, the gaming server 113 is operated by a provider of online wagering or fantasy sports services. Participants indicate to the gaming server 113 their gaming selections (e.g., a selected lineup, team, predicted event). During the real life competition(s), the gaming server 113, for example, receives updates about events that occurred during the competition to determine the result of the game. For example, for fantasy sports games, the gaming server 113 converts the events into an amount of accrued points for each participant. At the end of the real life competition(s), the gaming server 113 determines the particular participant that won the game.

To participate in a game supported by the gaming server 113, the participants interact with a client device 105, such as mobile phone 105*a*, laptop computer 105*b*, a tablet, a smart wearable device (e.g., smart glasses, a smart watch), a home personal assistance device, or any other electronic device that is normally used to access internet-based content. The client devices 105 are communicatively coupled to the gaming server 113 via one or more wired or wireless networks 110 that facilitate any type of data communication via any current or future-developed standard or technology (e.g., GSM, CDMA, TDMA, WCDMA, LTE, EDGE, OFDM, GPRS, EV-DO, UWB, IEEE 802 including Ethernet and Wi-Fi, WiMAX, Bluetooth, and others). Although FIG. 1 only illustrates two client devices 105, the environment 100 may include any number of client devices 105.

In some embodiments, a participant uses the client device 105 to interact with one or more user interfaces supported by the gaming server 113. For example, one user interface enables participants to indicate their desired lineup. As another example, another user interface provides insight and/or analysis to facilitate the selection process. However, when the gaming server 113 provides these insight and/or analysis interfaces, the gaming server 113 is conventionally configured to only provide the aforementioned less reliable types of analyses. Thus, participants relying on analyses supported by conventional gaming servers 113 are unable to receive the appropriate insight to make the most accurate and informed predictions about outcomes of the real life competitions.

Instead, embodiments disclosed herein include an analytics platform 115 configured to provide the more accurate and more predictive analyses for participants of games supported by the gaming server 113. Like, the gaming server 113, the analytics platform 115 is accessible via the one or more wired or wireless networks 110. Although the environment 100 includes the analytics platform 115 as a separate entity than the gaming server 113 that is directly accessible by the client devices 105 over the networks 110, in alternate embodiments, the analytics platform 115 may be a component of the gaming server 113 and/or accessible by the gaming server 113 via local or private communication networks (i.e., communication networks to which client devices 105 do not generally have access).

The analytics platform 115 includes one or more processors 128 configured to execute instructions that form the various applications, modules, and other components of the analytics platform 115 described herein. The processors 128 may include central processing units (CPUs), graphics processing units (GPUs), application-specific integrated circuits (ASICS), and/or any other types of computer processors. While the disclosure may generally refer to the processors 128 executing the various tasks described herein, particular tasks may be better suited to one type of processor. For example, the repetitive analysis associated with some forms of machine learning may be more efficiently executed by GPUs than CPUs. Accordingly, in embodiments that include multiple types of processors, the analytics platform 115 may utilize a particular type of processor to execute instructions that is more efficiently executed by the particular type of processor.

Additionally, it should be appreciated that while FIG. 1A illustrates that analytics platform 115 as a single entity, in other embodiments, the analytics platform 115 may be multiple entities acting in conjunction with one another. For example, in some embodiments, the analytics platform 115 is implemented in a distributed computing environment, such as a cloud computing environment. In these embodiments, the processors 128 may be physically located in different hardware entities (e.g., servers) despite the processors 128 being logically connected to execute the various tasks described herein.

The analytics platform 115 may also be operatively connected to a database 130 configured to store data to which the disclosed analytics techniques are applied. The database 130 may utilize any known database architecture. In one implementation, the database 130 is a relational database that links multiple data tables together through index values. For example, one data table may associate each player with a unique player identifier. To identify events associated with a particular player, the player identifier may be used as a search operator to obtain records in other data tables, such as data tables that maintain records of each event of a particular type (e.g., passing play, at bat, shot on goal, etc.).

In the illustrated embodiment, the analytics platform 115 also includes a program memory 120, a random-access memory (RAM) 127, and an input/output (I/O) circuit 129, all of which may be interconnected via an address/data bus 126. It should be appreciated the memory of the analytics platform 115 may include multiple RAMs 127 and multiple program memories 120 implemented as any type of memory, such as semiconductor memory, magnetically readable memory, or optically readable memory, for example. Similarly, although the I/O circuit 129 is shown as a single block, it should be appreciated that the I/O circuit 129 may include a number of different types of I/O circuits. For example, the I/O block 129 may include one or more transceiver circuits to facilitate communications over the networks 110 and/or directly with data sources.

The program memory 120 may store any number of applications, routines, tools, or other collections of computer-readable instructions that support the analytics techniques described herein. For example, the program memory 120 may include gaming tools 125 that are supported by the applications 121-124. The tools 125 may include a head-to-head comparison tool, a matchup analysis tool, an injury analysis tool, a lineup optimizer tool, a lineup selection tool, and/or a user-directed prediction tool. One application that supports the tools 125 is an ingestion application 123 configured to obtain data from data sources 117 and convert the data into a format suitable for storage at the database 130.

As illustrated, the analytics platform 115 is connected to a plurality of data sources 117 that provide information related to the game, players, and/or the real life competition. For example, a first data source 117*a* may maintain a record of the teams and/or players participating in competitions on a particular day. In the illustrated embodiment, the gaming server 113 maintains the data source 117*a*. If the gaming server 113 supports daily fantasy games, the player records maintained at the data source 117*a* are also typically associated with a price or other constraint on how participants select a lineup. In some embodiments, the data source 117*a* maintained by the gaming server 113 also includes information relating to lineups participants have submitted to compete in a game, such as a percentage of participants that have selected a player in their respective lineups.

In another example, the first data source 117*a* maintained by the gaming server 113 includes wagering data indicative of different bets available at the gaming server 113. For instance, the wagering data may indicate a line for an event, an over/under for an event, and/or various proposition (or "prop") bets associated with an event, as well as their corresponding odds. In some embodiments, the first data source 117*a* includes wagering data corresponding to a plurality of different gaming servers 113.

In addition to the data source 117*a*, the analytics platform 115 may also be connected to a data source 117*b* that maintains records of historical player and/or team statistics, a data source 117*c* that maintains records relating to player popularity, a data source that compiles expert rankings of players, a data source that provides weather data for the location of the real life competitions associated with the game, and/or any number of other data sources that maintain records that are useful in making gaming selections. Accordingly, although FIG. 1 illustrates the analytics platform 115 being connected to three data sources 117, the analytics platform 115 may be connected to any number or combination of data sources 117. For example, the analytics platform 115 may be connected to two different data sources 117 that provide historical statistics for players and/or teams. In this example, some of the data sources 117 may be organized by play or event and others of the data sources may be organized by player participation (e.g., who was on the field during the play and their role during the play).

In some embodiments, one of the data sources 117 is configured to automatically transmit records maintained thereat on a periodic basis to the analytics platform 115. For example, the analytics platform 115 may be subscribed to a data source 117 that pushes new data (such as play outcomes) to a list of subscribed devices. In these embodiments, the ingestion application 123 is configured to detect the reception of a subscribed data record.

Additionally or alternatively, one of the data sources 117 is configured to provide the data maintained therein in response to a received query. For example, this data source 117 may provide an application programming interface (API) that controls access to the data stored therein. The analytics platform 115 may occasionally determine that additional data is needed. For example, a user of the analytics platform 117 may be attempting to view the most recent player ownership statistics. As another example, the analytics platform 115 may periodically determine that updated weather information should be obtained in view of shifting forecasts. In any event, to obtain the needed data, the analytics platform 115 generates an instruction in accordance with the API of the data source 117 and transmit the instruction to the data source 117 via the I/O circuit 129. In these embodiments, the ingestion application 123 is configured to detect the response that includes requested data.

Upon obtaining data from the data sources 117, the ingestion application 123 converts the data into a format supported by the database 130. In one example, data sources 117 that maintain historical player statistics may not utilize the same player identifier. Accordingly, the ingestion application 123 may convert any player identifiers in the received data to be consistent with the identifiers utilized at the database 130. As another example, data sources 117 that maintain event (e.g., play, at bat, etc.) records may utilize different identification systems. Accordingly, the ingestion application 123 may convert any event identifiers to be consistent with the event identification system implanted at the database 130. After converting the format of the obtained data, the ingestion application 123 may then update records maintained at the database 130 to include the obtained data.

Another application stored in the program memory 120 is an export application 124 configured to export gaming selections for submission at the gaming server 113. To make the gaming selections, a participant may interact with a respective client device 105 to indicate their selections to the analytics platform 115, for example via a line selection tool of the tools 125. More particularly, the participant may cause the client device 105 to execute an application in a program memory 140 configured to interact with the analytics platform 115.

Similar to the analytics platform 115 and as shown in FIG. 1B, the client device 105 includes the program memory 140, one or more processors 148, a random-access memory (RAM) 147, a display 144, and an input/output (I/O) circuit 149, all of which may be interconnected via an address/data bus 146. It should be appreciated the memory of the client device 105 may include multiple RAMs 147 and multiple program memories 140 implemented as any type of memory, such as semiconductor memory, magnetically readable memory, or optically readable memory, for example. Similarly, although the I/O circuit 149 is shown as a single block, it should be appreciated that the I/O circuit 149 may include a number of different types of I/O circuits. For example, the I/O block 149 may include one or more transceiver circuits to facilitate communications over the networks 110.

In some embodiments, the program memory 140 includes a browser application 142 that enables the participant to access a website associated with the analytics platform 115 and/or the gaming server 113. Additionally or alternatively, the program memory 140 includes a dedicated analytics application 143 for interacting with the analytics platform 115. The analytics application 143 may be downloaded to the client device 105 via an application store, downloaded from a website, or otherwise installed onto the client device 105. In some embodiments, the analytics application 143 is a standalone executable application that generates and presents interfaces on the display 144 associated with the tools 125. In other embodiments, the analytics application 143 is a plugin, bookmarklet, or other software package that modifies the operation of the browser 142. For example, the analytics application 143 may be configured to detect that the browser 142 is viewing a website associated with the gaming server 113 and modify the display of the website to include access to the tools 125. As a result, instead of simply displaying a conventional website, the analytics application 143 creates a hybrid website that supports the functionality of both the gaming server 113 and the analytics platform 115.

Returning to the export application 124, the analytics platform 115 is configured to export the lineup selected via the browser 142 and/or the analytics application 143. In one embodiment, the export application 124 generates an export file that is sent to client device 105 via the network 110. For example, the export file may be a comma separated value (CSV) or extensible markup language (XML) file that includes a list of gaming selections. Accordingly, if the gaming server 113 supports upload-based submission of gaming selections, the participant can utilize the browser 142 to upload the export file to the gaming server 113.

In some embodiments where the analytics application 143 modifies operation of the browser 142, the export application 124 exports an indication of the gaming selections to the analytics application 143. In some scenarios, the indication be the list of gaming selections. In other scenarios, the indication relates to a location at the analytics platform 115, such as a participant profile, at which the list of gaming selections are stored. In either scenario, when the browser 142 displays a gaming selection interface associated with the gaming server 113, the analytics application 143 may enable the client device 105 to fill in the gaming selections for submission. In some embodiments, the analytics application 143 automatically fills in the gaming selections upon detecting that the browser application 142 is presenting the gaming selection interface associated with the gaming server 113. In other embodiments, the analytics application 143 presents one or more user interface elements upon detecting that the browser application 142 is presenting the gaming selection interface associated with the gaming server 113. The user interface elements, when selected by the participant, cause the analytics application 143 to fill in the gaming selections for submission to the gaming server 113.

In still other embodiments, the gaming server 113 supports an API that enables submission of gaming selections directly from the analytics server 115. Accordingly, in these embodiments, the export application 124 generates an instruction in accordance with the API of the gaming server 113 and transmits the instruction to the gaming server 113.

The program memory 120 of the analytics platform 115 also includes two additional applications that support the display of information associated with the tools 125: a UI application 121 that controls the layout of the various interfaces displayed by the display 144 of the client device 105 and an update application 122 that obtains, generates, and/or fills in the data that is displayed in the layout dictated by the UI application 121. For example, one of the tools 125 may include a heat map for a quarterback that indicates a particular player's statistics when throwing the ball towards different location of the field. Accordingly, the UI application 121 may indicate that the heat map should be displayed at a particular portion of an interface presented by the display 144 and the update application 122 may query the database 130 to obtain the displayed statistics associated with the heat map.

In some embodiments, the database 130 does not store the data in a manner that can be directly imported into the designated portion dictated by the UI application 121. Referring again to the heat map example, the database 130 may include indexed records of play outcome, such as an index of all passing play or an index of all plays that occurred. In this example, it would be duplicative and require a significant amount of storage to convert the play outcomes to respective data tables associated with each individual player. For example, a passing play includes both the quarterback and the targeted player. Thus, organizing the play data into data tables based on players causes the record associated with a particular play to be stored at two different data tables.

Accordingly, the update application 122 may instead generate a temporary data table for a particular player in response to a participant interacting with one of the tools 125 to view the heat map for the particular player. In the quarterback heat map example, the update application 122 utilizes the player identifier for the particular player to extract each record of a play that involves the particular player throwing the ball. The update application 122 may then filter the records based on an indicated location of the field to which the ball was thrown to compile a set of statistics for the player performance throwing the ball to each area of the field. The update application 122 then stores these sets of statistics in a new temporary data table that is utilized to populate heat table the UI application 121 directs should be displayed on the client device 105. Of course, the heat map is just one example of a temporary data table that is generated by the update application 122 and the tools 125 may causes any type of different data table to be generated based on the type of analysis supported by the tools 125. When the user of the client device 105 is done interacting with the tools 125, the update application 122 may then delete any temporary data tables generated to support the tools 125.

Figure 2A:
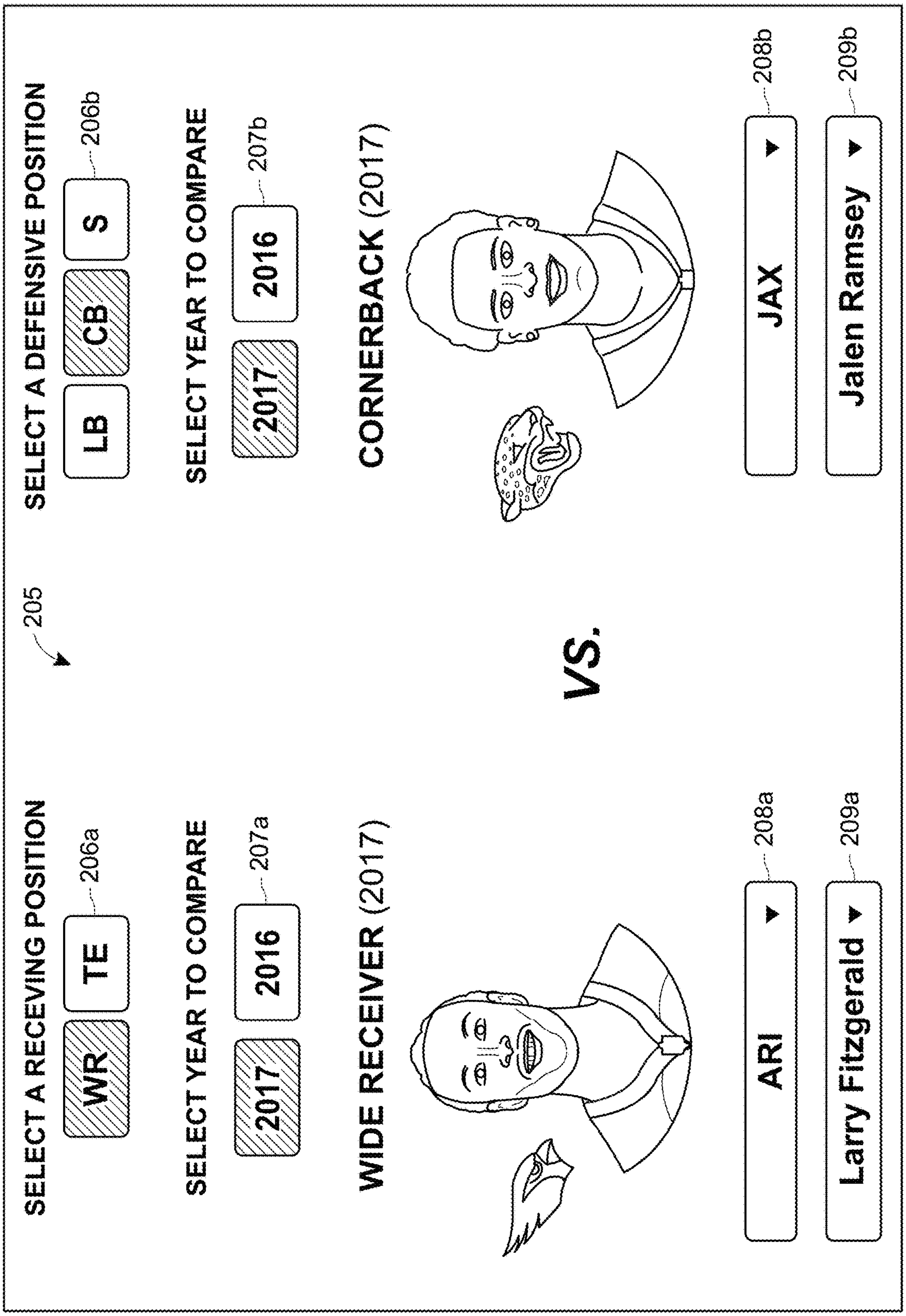
FIG. 2A is an example user interface presented by a client device interacting with a receiver-defender matchup analysis tool of the analytics platform, the user interface for selecting a receiver and a defender to compare.

Turning now to FIG. 2A, illustrated is an example user interface 205 presented by the client device 105 interacting with a receiver-defender matchup analysis tool of the plurality of tools 125 supported by the analytics platform 115. As illustrated, the receiver-defender matchup analysis tool enables the participant to select a receiver (e.g., a wide receiver or a tight end) and a defender (e.g., a cornerback, a linebacker, or a safety) to compare by using the position selection elements 206. It should be appreciated that unlike conventional analytics tools that only enable participants to compare wide receivers to cornerbacks, the example user interface 205 enables the participant to select linebackers and safeties for comparison. To this end, wide receivers often face coverage by linebackers or safeties, thus the conventional techniques that limit the analysis to cornerback coverage provides less accurate insight than the disclosed receiver-defender matchup analysis tool.

To select a particular player, the example user interface 205 also includes year selection elements 207 and team drop down lists 208. The update application 122 monitors the selections made via elements 206-208 to create a filtered list of players that match the selections. Accordingly, when the participant interacts with the drop down lists 209, the participant can select a player from the filtered list of players generated by the update application 122. After the participant selects a receiver and a defender to compare, the receiver-defender matchup analysis tool presents information for comparison.

As described above, the receiver-defender matchup analysis tool may be provided as part of a hybrid webpage presented by the client device 105 and/or as a lineup selection tool and/or a lineup optimization tool included in the plurality of tools 125. In the hybrid website example, the receiver-defender matchup analysis tool may be accessible via a lineup selection website supported by the gaming server 113. In these embodiments, the analysis application 143 may modify the website provided by the gaming server 113 to include one or more user interface elements configured to launch the receiver-defender matchup analysis tool.

In some implementations, each player includes a respective user interface element configured to launch the receiver-defender matchup analysis tool in a state that includes the player as a default selection. In additional implementations, the user interface element is further configured to launch the receiver-defender matchup analysis tool in a state that includes the team the player is performing against as the default team selected via drop down list 208*b*. In the hybrid website implementation, the analysis application 143 may identify any text on the website generated by the gaming server 113 to generate user interface elements that transmit an indication of the player identifier and/or opposing team when selected. Similarly, the analytics platform 115 may directly incorporate the links to the receiver-defender matchup analysis tool as part of the lineup selection and/or lineup optimization tools included in the tools 125. In either example, the receiver-defender matchup analysis tool is made available in a context-aware manner that reduces the user interaction required to view the most pertinent data.

Turning now to FIG. 2B, illustrated is an example user interface template 210 generated by the UI application 121 as part of the receiver-defender matchup analysis. As described above, the user interface template 210 controls the layout via which the data associated with the receiver-defender matchup analysis tool is displayed. As illustrated, instead of the actual values for the displayed data, the user interface template 210 includes indication of a particular type of data that should be filled in. For example, instead of an actual image of the player, the user interface template 210 includes an indication of the particular variable, parameter, or attribute ("Player1_img") to be obtained by the update application 122.

The example user interface template 210 defines the layout of a portion of a user interface for comparing the historical performance of a selected receiver (e.g., the receiver selected via drop down list 209*a*) when running a plurality of routes and a defender (e.g., the defender selected via drop down list 209*b*) when defending against the plurality of routes. For example, the example user interface template 210 defines that a player image 211 ("Player1_img"), a player name 212 ("Player1_name"), and player position 213 ("Player1_pos") is displayed above a table 214 indicating the performance with respect to a plurality of routes ("Player1_route.csv"). After the UI application 121 generates the user interface template 210 and/or after the participant selects a different player via the drop down lists 209, the update application 122 obtains the data to fill in the user interface template 210.

To obtain the data, each player in the drop down lists 209 is associated with a player identifier. The update application 122 then utilizes this player identifier to obtain the particular data indicated by the user interface template 210. In one example, the update application 122 may utilize the player identifier to query a data table that stores various properties of the player, including name, position, and a location of a player image file to populate the player name 212, player position 213, and player image 211, respectively.

Unlike the player name 212 or player position 213, the update application 122 may not be able to simply query a data table to provide the data for the route data tables 214 to the UI application 121. In this scenario, the update application 122 generates a temporary data table to be the table 214 displayed by the user interface. In one example, the update application 122 uses the player identifier to query a data table storing all plays or all passing plays to extract all plays in which the player was targeted by a pass. The update application 122 then sorts the extracted plays based on the route ran by the receiver to generate one or more statistics, such as number of targets, number of receptions, number of interceptions, number of touchdowns, average depth of target (aDot), quarterback rating, etc., for each route type. These generated statistics are then compiled into the table 214 for display on the user interface.

FIG. 2C is an example user interface 230 displaying the user interface template 210 as filled in by the update application 122. As illustrated in FIG. 2C, the example user interface 230 includes the values for the player name 232, the player position 233, the player image 231, and the data table 234 obtained and/or generated by the update application 122.

It should be appreciated that although FIG. 2B illustrates a graphical depiction of the user interface template 210, in some embodiments, the user interface template 210 is not actually displayed on the client device 105. Rather, it is the example user interface 230 of FIG. 2C that includes the data values populated by the update application 122 that is displayed by the client device 105. Accordingly, FIG. 2B is the provided for ease of explaining how the example user interface 230 is generated and not to imply that the user interface template 210 is actually displayed.

FIG. 2D is an example user interface 240 of the receiver-defender matchup analysis tool. The example user interface 240 includes a graphical comparison 242 of historical performance for a receiver (e.g., the receiver selected via drop down list 209*a*) and a defender (e.g., the defender selected via drop down list 209*b*) with respect to a plurality of routes. As described herein, the layout of the user interface 240 is controlled by a user interface template generated by the UI application 121 and the specific information displayed by the user interface 240 is obtained and/or generated by the update application 122. More particularly, the update application 122 may generate the data tables 214*a* and 214*b* as described with respect to FIG. 2B, then apply known graph generation tools to the generated data tables to present the graphical comparison 242.

FIG. 2E is an example user interface 250 of the receiver-defender matchup analysis tool. The example user interface 250 includes a table 252*a* of the historical performance of a receiver (e.g., the receiver selected via drop down list 209*a*) when facing a plurality of types of defenses and table 252*b* of the historical performance of a defender (e.g., the defender selected via drop down list 209*b*) when performing the plurality of types of defenses.

Similar to generating the data tables 214, the update application 122 uses the player identifiers to query a data table storing all plays or all passing plays to extract all plays in which the player was targeted by a pass. The update application 122 then sorts the extracted plays based on the type of coverage performed by the defense to generate one or more statistics, such as percentage of plays a player faced or executed the type of coverage, number of targets, number of receptions, number of interceptions, number of touchdowns, yards per target (YPT), average depth of target (aDot), a quarterback rating, etc., for each coverage type. These generated statistics are then compiled into a data table 214 display on the example user interface 250 as tables 252.

In addition to the above-described interfaces, the receiver-defender matchup analysis tool may provide additional or alternative user interfaces. One such additional user interface includes a comparison of where the players have historically lined up during plays. For example, receivers may line up as the left wide receiver, the left slot receiver, the left tight end, right tight end, right slot receiver, or right wide receiver. Based on these percentages, the participant may determine whether the comparison is an appropriate one. To this end, a receiver that lines up on the right side of the field would face a left side defender. Accordingly, it is less useful to compare this receiver to a defender that lines up on the right side of the defense. Thus, by providing the positional breakdown for receivers and defenders, the participant can avoid being influenced by factors that are not predictive of future performance of a selected receiver.

Turning now to FIGS. 3A-3F, illustrated are example user interfaces presented by the client device 105 interacting with a head-to-head analysis tool of the plurality of tools 125 supported by the analytics platform 115. It should be appreciated that the layouts of the example user interfaces are controlled by a user interface template generated by the UI application 121 and the specific information displayed by the example user interfaces are obtained and/or generated by the update application 122.

Figure 3A:
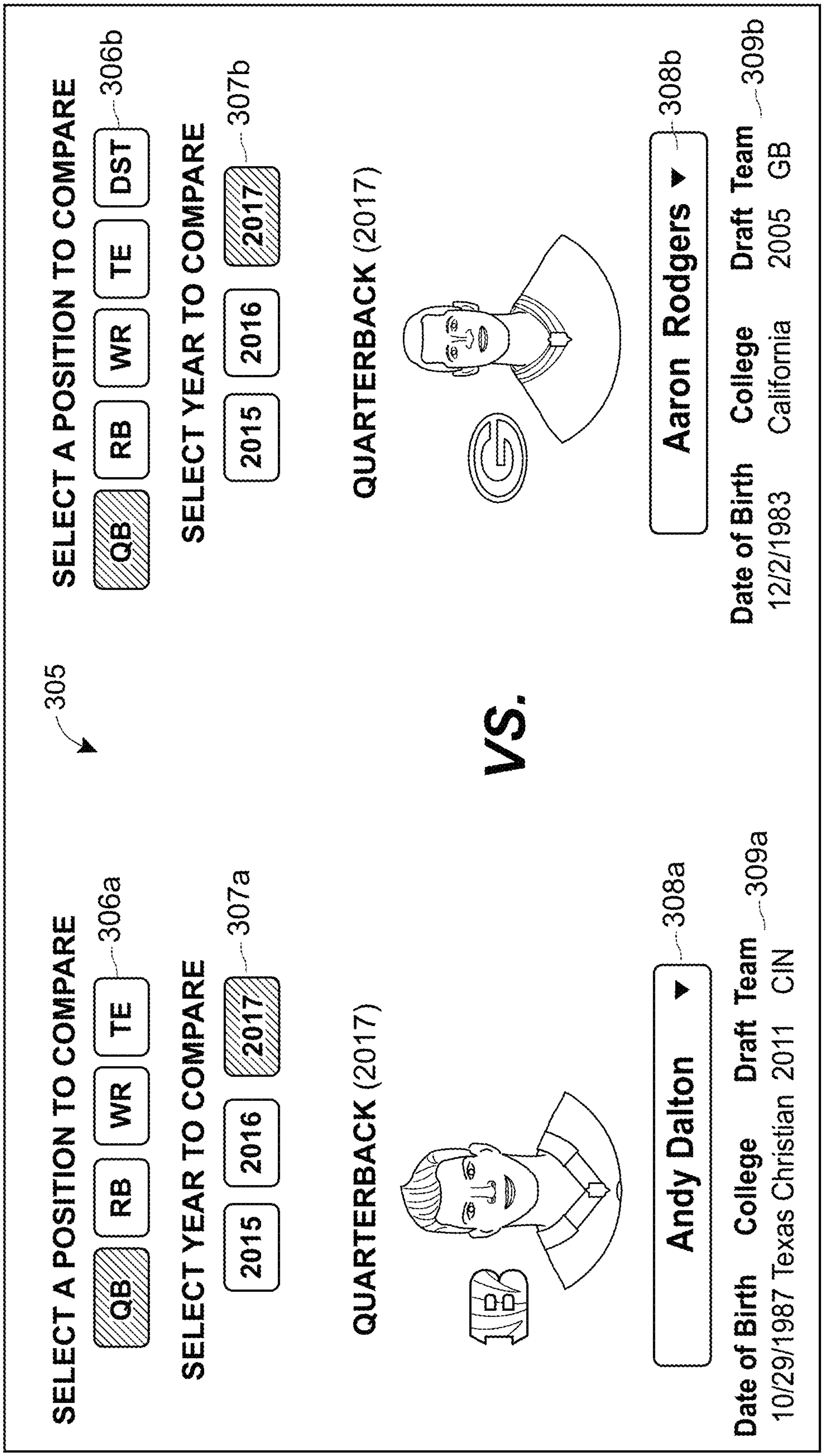
FIG. 3A is an example user interface presented by a client device interacting with a head-to-head analysis tool of the analytics platform, the user interface for selecting two players to compare.

Starting with FIG. 3A, illustrated is an example user interface 305 for selecting two players to compare using the head-to-head analysis tool supported by the analytics platform 115. As illustrated, the head-to-head analysis tool enables the participant to compare players at any offensive position to one another. Accordingly, the example user interface 305 includes position selection elements 306. To select the particular players to compare, the user interface 305 also includes year selection elements 307. The update application 122 monitors the selections made via elements 306 and 307 to create a filtered list of players that match the selections. Accordingly, when the participant interacts with the drop down lists 308, the participant can select a player from the filtered list of players generated by the update application 122. After the participant selects two players to compare, the head-to-head analysis tool presents information for comparison. For example, the information may include biographical information 309 associated with the players selected via the drop down boxes 308.

In addition to comparing two offensive players to one another, the position selection element 306*b* enables the participant to compare a player to defense/special teams "player". It should be appreciated that in many fantasy sports games, participants select a lineup that includes a team's defense as opposed to individual defensemen. However, in some fantasy sports games, participants may select individual defensive players. Thus, in alternate embodiments, the position selection elements may enable the selection of individual defensive players.

FIG. 3B illustrates an example user interface 320 presented by the head-to-head analysis tool supported by the analytics platform 115. The example user interface 320 includes indications of past performance of the two players selected via the drop down boxes 308. For example, the example user interface 320 includes spider graphs 323 for a plurality of performance metrics. In the illustrated example comparing two quarterbacks, the performance metrics may include fantasy points per game, passing attempts per game, passing yards per game, yards per attempt, touchdowns per game, rushing attempts per game, rushing yards per game, rushing touchdowns per game, and interceptions per game.

Of course, other comparisons may involve different sets of performance metrics. As one example, a comparison between wide receivers and/or tight ends may include fantasy points per game, receiving yards per game, receiving touchdowns per game, receiving targets per game, receiving targets as a percentage of team total targets, receptions per game, targets per snap, true target share, red zone target share, deep target share, and yards after catch. As another example, a comparison between two running backs may include fantasy points per game, rushing yards per game, receiving yards per game, yards per carry, touchdowns per game, weighted opportunity, carries per game, targets per game, targets as a percentage of team total, red zone carry share percentage, percentage of snaps on the field per game, and success rate.

Another set of different performance metrics may be displayed when the comparison includes a defensive unit. For an example comparison between a quarterback and a defense, the performance metrics for the defense may include fantasy points against per game by quarterbacks, passing attempts against per game, passing yards against per game, passing touchdowns against per game, yards per attempt against, quarterback rushing attempts against per game, quarterback rushing yards against per game, quarterback rushing touchdowns against per game, sacks per game, and interceptions per game. For another example comparison between a running back and a defense, the performance metrics for the defense may include fantasy points against per game by running backs, rushing attempts against per game, rushing yards against per game, rushing touchdowns against per game, running back targets against per game, running back receiving yards against per game, yards per carry against, weighted opportunity against per game, and success rate against. As yet another example comparison between a wide receiver or tight end and a defense, the performance metrics for the defense may include fantasy points against per game by WR1s (wide receivers ranked 1-12 for a particular week), fantasy points against per game by WR2s (wide receivers ranked 13-24 for a particular week), fantasy points against per game by WR3s (wide receivers ranked 25-36 for a particular week), fantasy points against per game by TE1s (tight ends ranked 1-12 for a particular week), fantasy points against per game by TE2s (tight ends ranked 13-24 for a particular week), receiving yards against per game by WR1s, WR2s, WR3s, TE1s, and/or TE2s, receiving touchdowns against per game by WR1s, WR2s, WR3s, TE1s, and/or TE2s, and target share against by WR1s, WR2s, WR3s, TE1s, and/or TE2s.

In addition to the spider graphs 323, the example user interface 320 may present the raw performance metric values and the percentile of performance for each of the performance metrics in tables 324. It should be appreciated that different fantasy games involve different scoring systems. Accordingly, performance metrics that involve fantasy points vary depending on the particular fantasy game. Thus, the example user interface 320 includes a fantast point scoring system selection element 322. While the example user interface 320 depicts the ability to select from a set of pre-defined scoring systems, alternate user interfaces enable the participant to customize the scoring rules based on the particular game in which the participant is participating. Regardless, in response to detecting that the scoring system has been changed via the selection element 322, the update application 122 updates the displayed performance metrics in view of the selected scoring system.

Figure 3C:
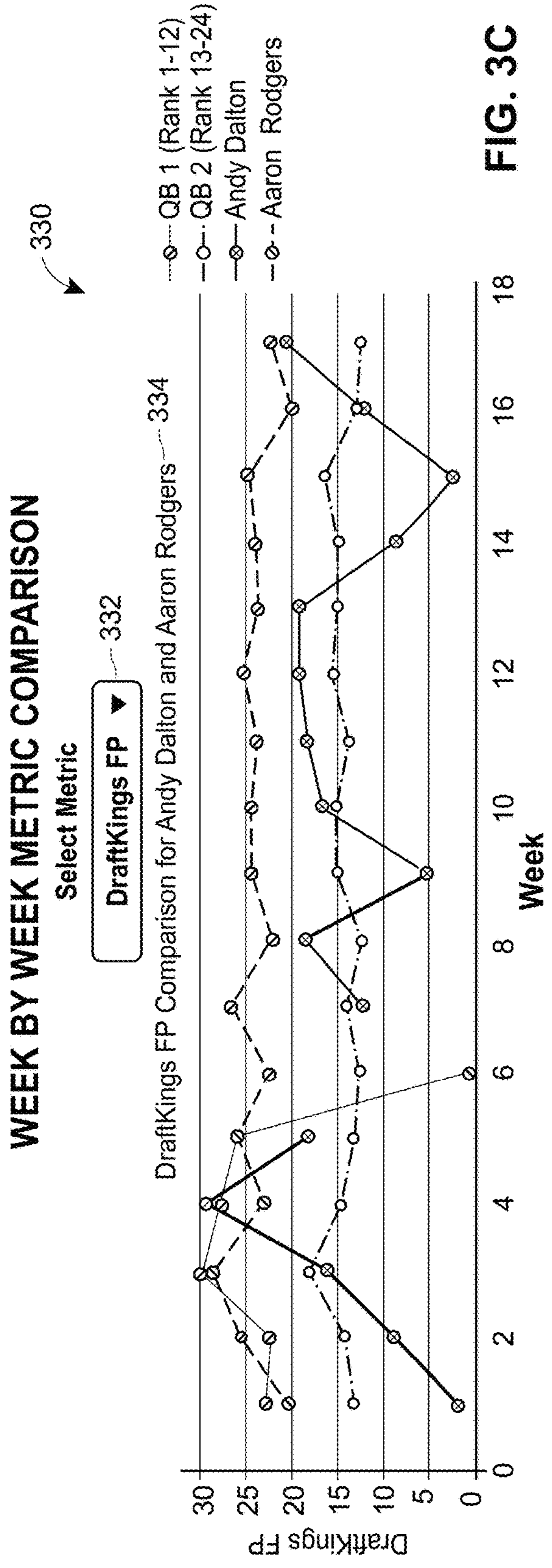
FIG. 3C is an example user interface presented by a client device interacting with a head-to-head analysis tool of the analytics platform, the user interface for graphically comparing the two players weekly performance to the top percentiles of other players.

FIG. 3C is another example user interface 330 presented the head-to-head analysis tool supported by the analytics platform 115. The example user interface 330 includes a graphical comparison 334 of the weekly performance of the two players selected via the drop down boxes 308 and the top two tiers of players at their position. Again, because of the different fantasy point scoring systems, the example user interface 330 includes a fantast point scoring system selection element 332. Accordingly, in response to detecting that the scoring system has been changed via the selection element 332, the update application 122 updates the displayed performance metrics in view of the selected scoring system.

Figure 3D:
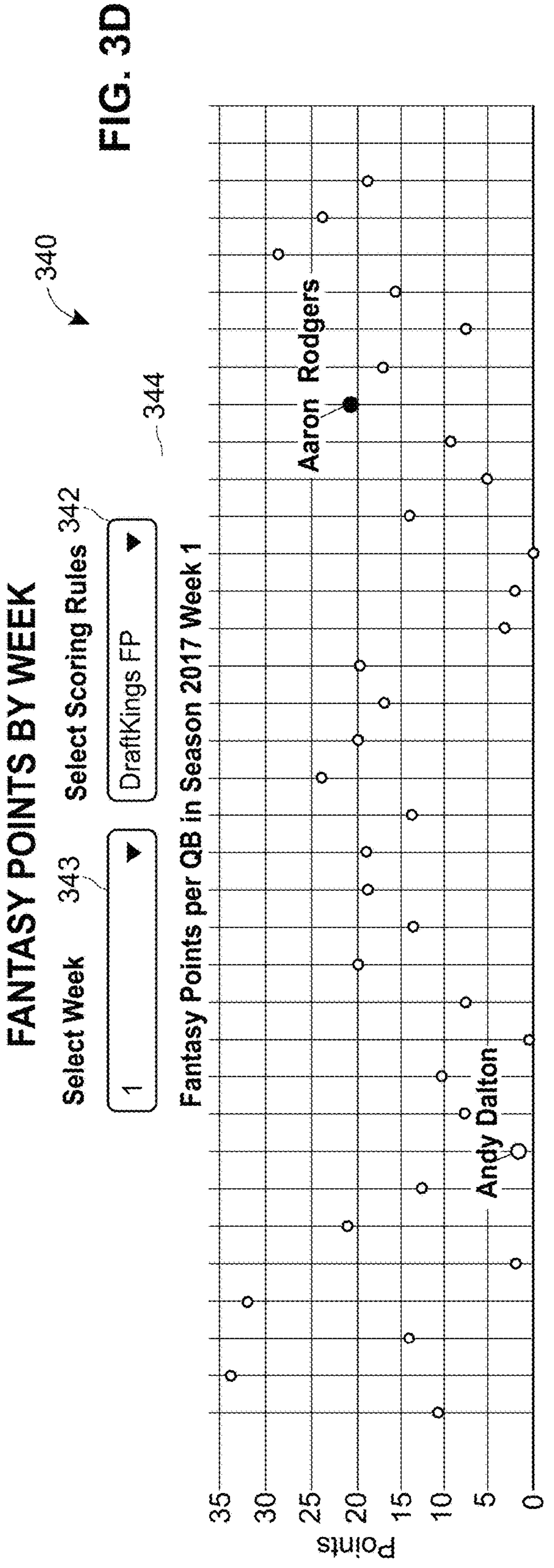
FIG. 3D is an example user interface presented by a client device interacting with a head-to-head analysis tool of the analytics platform, the user interface for graphically comparing the two players performance to other players' performance during the same game period.

FIG. 3D is yet another example user interface 340 presented the head-to-head analysis tool supported by the analytics platform 115. The example user interface 340 includes a graphical comparison indicating the performance of the two players selected via the drop down boxes 308 to all other performances for a particular week. Accordingly, the example user interface 340 includes a week selection element 343. In response to detecting that week has been changed via the selection element 343, the update application 122 obtains the set of performance metrics for the indicated week. Again, because of the different fantasy point scoring systems, the example user interface 340 includes a fantast point scoring system selection element 342. Thus, in response to detecting that the scoring system has been changed via the selection element 342, the update application 122 updates the displayed performance metrics in view of the selected scoring system.

Figure 3E:
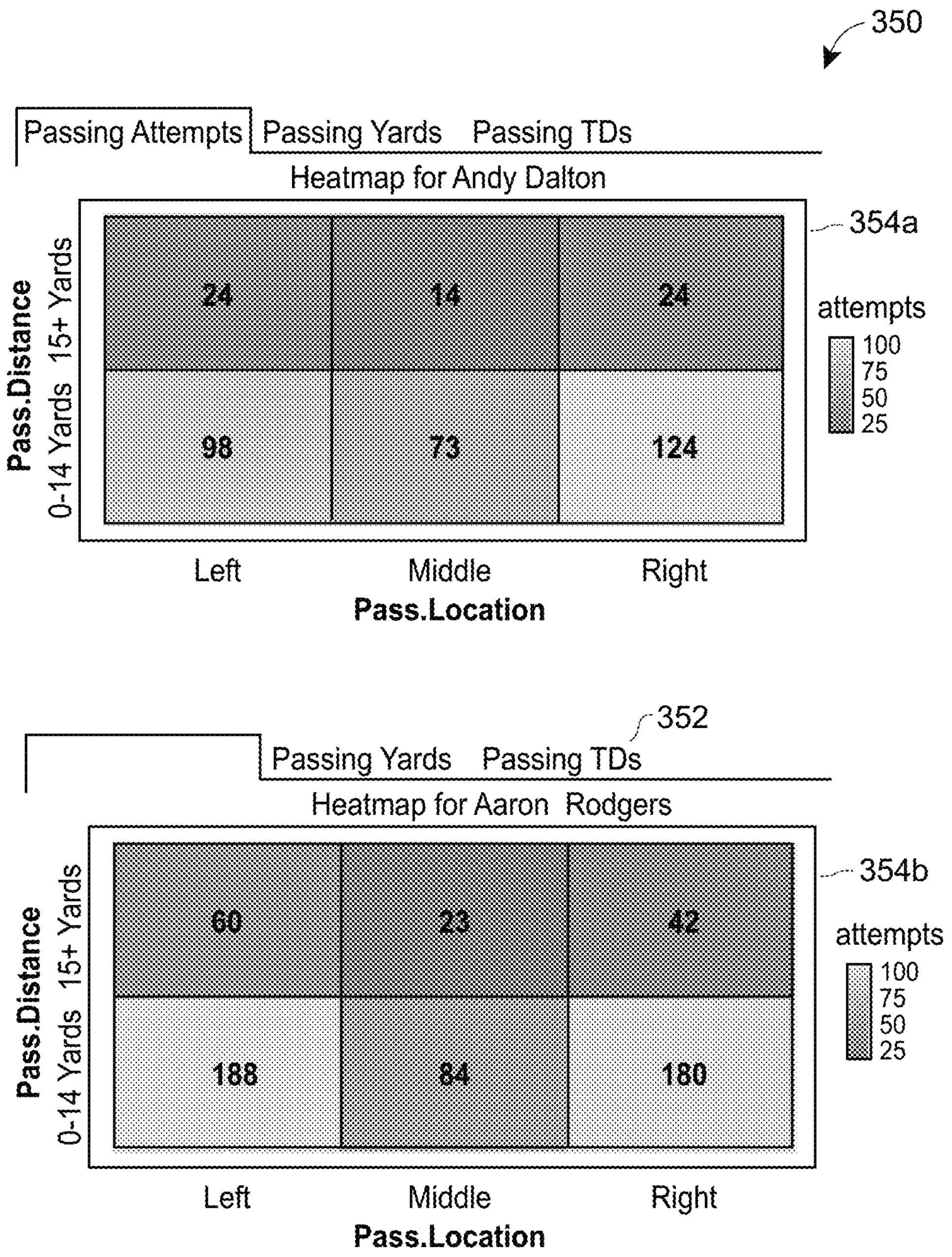
FIG. 3E is an example user interface presented by a client device interacting with a head-to-head analysis tool of the analytics platform, the user interface for graphically comparing the two players performance throwing the ball to a plurality of areas of the field via a heat map.

FIG. 3E is still another example user interface 350 presented by the head-to-head analysis tool supported by the analytics platform 115. The example user interface 350 includes "heat maps" 354 graphically comparing the two players selected via the drop down boxes 308 performance throwing the ball to a plurality of areas of the field. The color of the particular segments of the illustrated heat maps 354 change from deep red to bright green based upon the relative success of the player passing the ball to the corresponding area of the field. The example user interface 350 includes a performance metric selection 352 that enables the participant to view the heat map for different performance metrics, such as passing attempts, passing completions, total yards, and passing touchdowns. Accordingly, in response to detecting that the participant changes the performance metric via the element 352, the update application 122 changes the data and presented by the heat maps 354, as well as the color in which the segments are displayed.

It should be appreciated that the example user interface 350 depicts heat maps 354 that are particularly configured to compare quarterback performance metrics. Alternate example user interfaces are configured to depict heat maps that compare running back performance metrics, such as rushing attempts, rushing yards, and rushing touchdowns. Additionally, the shape of the heat map for a running back comparison may change from the arc shape illustrated in FIG. 3E to a rectangular shape.

FIG. 3F is another example user interface 360 presented by the head-to-head analysis tool supported by the analytics platform 115. The example user interface 360 includes a comparison of physical measurements for the two players selected by the drop down boxes 308. As illustrated, the physical measurements may be compared by both spider graphs 362 and as tables 364 that includes the raw measurement and the player percentile for the physical measurement.

Turning now to FIGS. 4A-4B, illustrated are example user interfaces presented by the client device 105 interacting with an injury analysis tool of the plurality of tools 125 supported by the analytics platform 115. It should be appreciated that the layouts of the example user interfaces are controlled by a user interface template generated by the UI application 121 and the specific information displayed by the example user interfaces are obtained and/or generated by the update application 122.

FIG. 4A illustrates an example user interface 400 presented by the injury analysis tool supported by the analytics platform 115. The example user interface 400 enables the participant to select a player to view the impact on team performance when the selected player is injured. To select a particular player, the example user interface 400 includes an offense/defense selection element 402, a year selection element 403, and a team selection element 404. The update application 122 monitors the elements 402-404 to generate a list of players matching the indicated selections. Accordingly, when the participant interacts with drop down list 405, the update application 122 causes the list of matching players to be available for selection.

When a participant selects a particular player, the update application 122 generates team performance splits with and without the selected player to include in table 407. To generate the performance splits, the update application 122 compiles a temporary data table that includes player participation for all plays over the course of the selected year and the respective play outcomes. The update application 122 then filters the list into plays (offensive or defensive based on the selection element 402) in which the selected player participated and plays in which the selected player did not participate. The update application 122 then generates a set of performance metrics for each set of plays.

For an offensive player, the performance metrics may include passing percentage, rushing percentage, run success rate (success rate is the rate the player achieves 40% of yards to gain on first down, 60% of yards to gain on second down, 100% of yards to gain on third down), passing success rate, explosive run rate (an explosive run is a run over 15 yards), explosive pass rate (explosive pass is a pass over 15 yards), turnover rate, sacks surrendered rate, yards per carry, yards per pass attempts, and number of snaps. On the other hand, for a defensive player, the performance metrics may include passing percentage against, rushing percentage against, run success rate against, passing success rate against, explosive run rate against, explosive pass rate, turnover rate, sack rate, yards per carry against, yards per pass attempts against, and number of snaps. The update application 122 compiles these performance metrics into another temporary data table to be presented as the data table 407 of the example user interface 400.

FIG. 4B is another example user interface 420 presented by the injury analysis tool supported by the analytics platform 115. The example user interface 420 enables the participant to view the impact on teammate performance when the player selected via the drop down list 405 is injured. Accordingly, the example user interface 420 includes a position selection element 422 to select the position on which the analysis will be performed.

The update application 122 monitors the selection element 422 to generate a list of players on the selected player's team that match the selected position. The update application then generates a first temporary data table that includes the listed players' performance with the selected player also participating to form the basis of the table 422 and a second temporary data table that includes the listed players' performance without the selected player participating to form the basis of the table 424. In the illustrated example relating to the injury's impact on wide receivers or tight ends, the performance metrics include a percentage of team targets, a percentage of plays lined up as the left wide receiver, a percentage of played lined up as the right wide receiver, a percentage of plays lined up as a slot receiver, a percentage of plays lined up as a tight end, a percentage of snaps played, an average depth of target, a red zone target percentage and a red zone touchdown rate.

In another example relating to the injury's impact on running backs, the performance metrics may include a percentage of snap played, a target percentage, and a red zone carry percentage. In still another example relating to the injury's impact on quarterbacks, the performance metrics may include a yards per attempt, an average depth of target, and touchdown rate.

It should be appreciated that the example user interfaces illustrated by FIGS. 2A-4B merely represent one example user interface that presents the illustrated information. Other user interfaces may include additional, fewer, or alternative elements. For example, some user interfaces may include a search bar to select a particular player instead of the illustrated selection elements. As another example, other sets of performance metrics may be displayed.

In some embodiments, the plurality of tools 125 include a lineup optimizer tool to determine an optimal lineup based on the analyses conducted by, for example, the head-to-head analysis tool, the receiver-defender matchup analysis tool, and the injury analysis tool. In some implementations, the analytics platform 115 implements one or more machine learning techniques, such as regression hypothesis testing or reinforcement learning, to determine which factors are most determinative of future player performance. Based on these determinations, the machine learning algorithm may assign the various factors a weight or weighting function. Accordingly, the lineup optimizer tool is able to generate a lineup capable of producing the most of a desired statistic (e.g., fantasy points, passing yards, home runs) within the constraints of a particular game.

In some embodiments, the participant is able to override the machine learning algorithm and lock in particular players into a lineup. For example, the user interface associated with the lineup optimizer may be configured to launch the head-to-head analysis tool via a user interface element associated with a player included in the optimal lineup. Upon launching the head-to-head tool via this user interface element, the analytics platform 115 automatically fills in the corresponding player as the player selected via, for example, the drop down box 308*a* of FIG. 3A. The head-to-head analysis tool may include an element that enables the participant to swap out the player in the optimal lineup for the player included in the head-to-head analysis (e.g., the player indicated by drop down box 308*b* of FIG. 3A). Upon selecting the this element, the lineup optimizer may be configured to calculate a new optimal lineup that includes the swapped-in player. As a result, the series of interfaces provided analytics platform 115 enables the participant to determine an optimal team based on both machine learning techniques and user-customized preferences.

Figure 5:
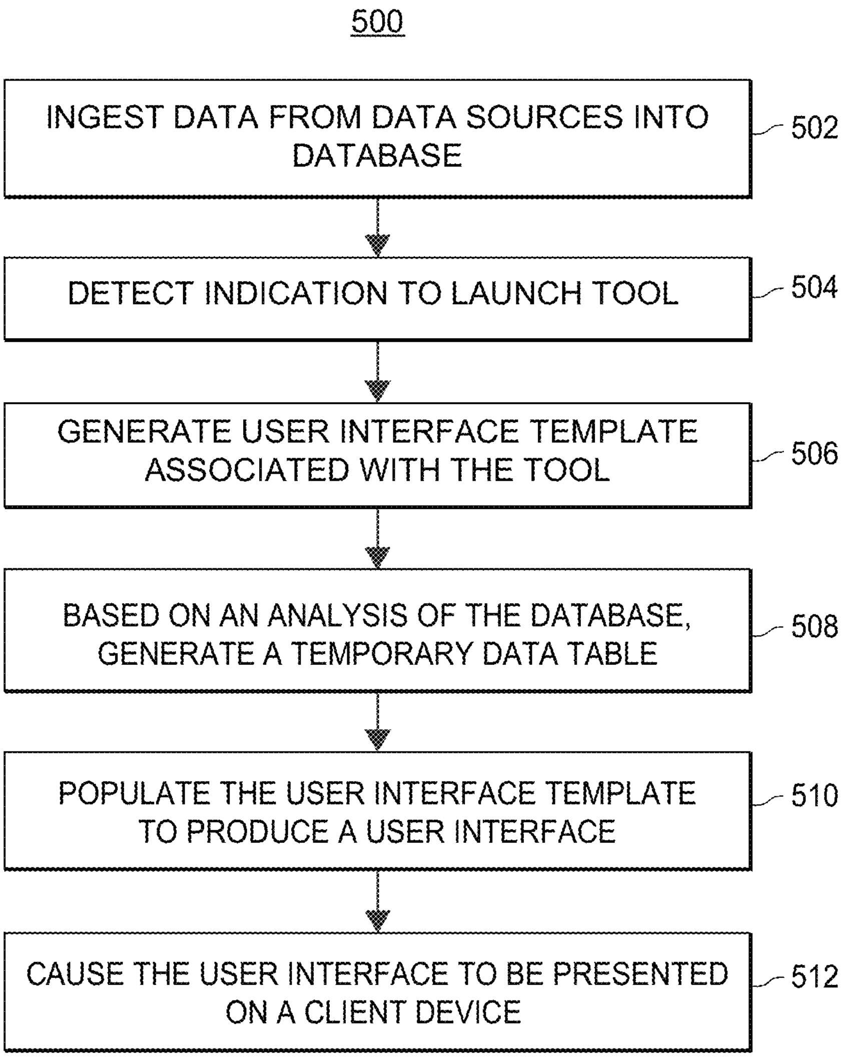
FIG. 5 is an example flow diagram for presenting a user interface associated with a tool of the analytics platform of FIG. 1A.

FIG. 5 is an example flow diagram for a method 500 of presenting a user interface associated with a tool of the plurality of tools 125 of the analytics platform 115.

At block 502, the method 500 includes ingesting, by the analytics platform 115, data from a plurality of data sources 117 into the database 130.

At block 504, the method 500 includes detecting, by the analytics platform 115, an instruction to launch a tool 125 supported by the analytics platform 115. For example, the tool can be a receiver-defender matchup analysis tool, a head-to-head analysis tool, or an injury analysis tool. In some embodiments, detecting the instruction to launch the tool 125 supported by the analytics platform 115 includes detecting, by the analytics platform 115, an indication that the participant selected a user interface element inserted into a website supported by a gaming server 113 by an analytics application 143 executing on the client device 105. In other embodiments, detecting the instruction to launch the tool 125 supported by the analytics platform 115 includes detecting, by the analytics platform 155, an indication that the participant selected a user interface element associated with another tool 125 supported by the analytics platform 115.

Additionally or alternatively, the user interface element is associated with a particular player and the indication that the participant selected the user interface element includes an indication of the particular player. Accordingly, detecting the instruction to launch the tool 125 causes the tool to launch in a state where the indicated player is pre-selected.

At block 506, the method 500 includes generating, by the analytics platform 115, a user interface template for presenting a user interface associated with the tool 125. The user interface template may include an indication of a data table to present via the user interface.

At block 508, based on an analysis of data stored in the database 130, the method 500 includes generating, by the analytics platform 115, a temporary data table that includes data values indicated by the user interface template.

At block 510, the method 500 includes populating, by the analytics platform 115, the user interface template with the data values included in the temporary data table to produce the user interface associated with the tool 125.

At block 512, the method 500 includes causing, by the analytics platform 115, the client device 105 to present the populated user interface associated with the tool 125. In some embodiments, the method 500 also includes detecting, by the analytics platform 115, that the tool 125 has ceased execution and deleting, by the analytics platform 115, the temporary data table.

User-Directed Predictions:

In some embodiments, the tools 125 includes a user-directed prediction tool that enables the participant to determine the impact of player performance on the outcome of the event, such as the amount of points that the team will score. For example, if the player is competing against a team that has a strong defense, the participant may think that the player is going to perform worse than average for that player. Accordingly, the participant can interact with the user-directed prediction tool to determine the impact of the player's below-average performance has on the event outcome. As a result, the participant can determine whether their predictions align with those used by sports books to generate a line or an over/under to identify a wagering opportunity. For instance, in the example where the player is facing a strong defense, the participant's prediction may align with the sports books. Thus, the user-directed prediction may not shift the expected outcome significantly. On the other hand, if the participant believes that the player facing the strong defense will nonetheless have a strong performance, the user-directed prediction may vary more significantly from the sports book prediction and present a wagering opportunity.

It should be appreciated that the user-directed prediction tool enables the participant to predict the performance for any number of players, including players on both teams, competing in the event. Consequently, the participant is provided fine-grained control over the predictive analyses conducted by the user-directed prediction tool. Said another way, the user-directed prediction tool provides a convenient interface for understanding the complex interrelationships between each player's performance and the respective impacts on the expected event outcome.

Figure 6A:
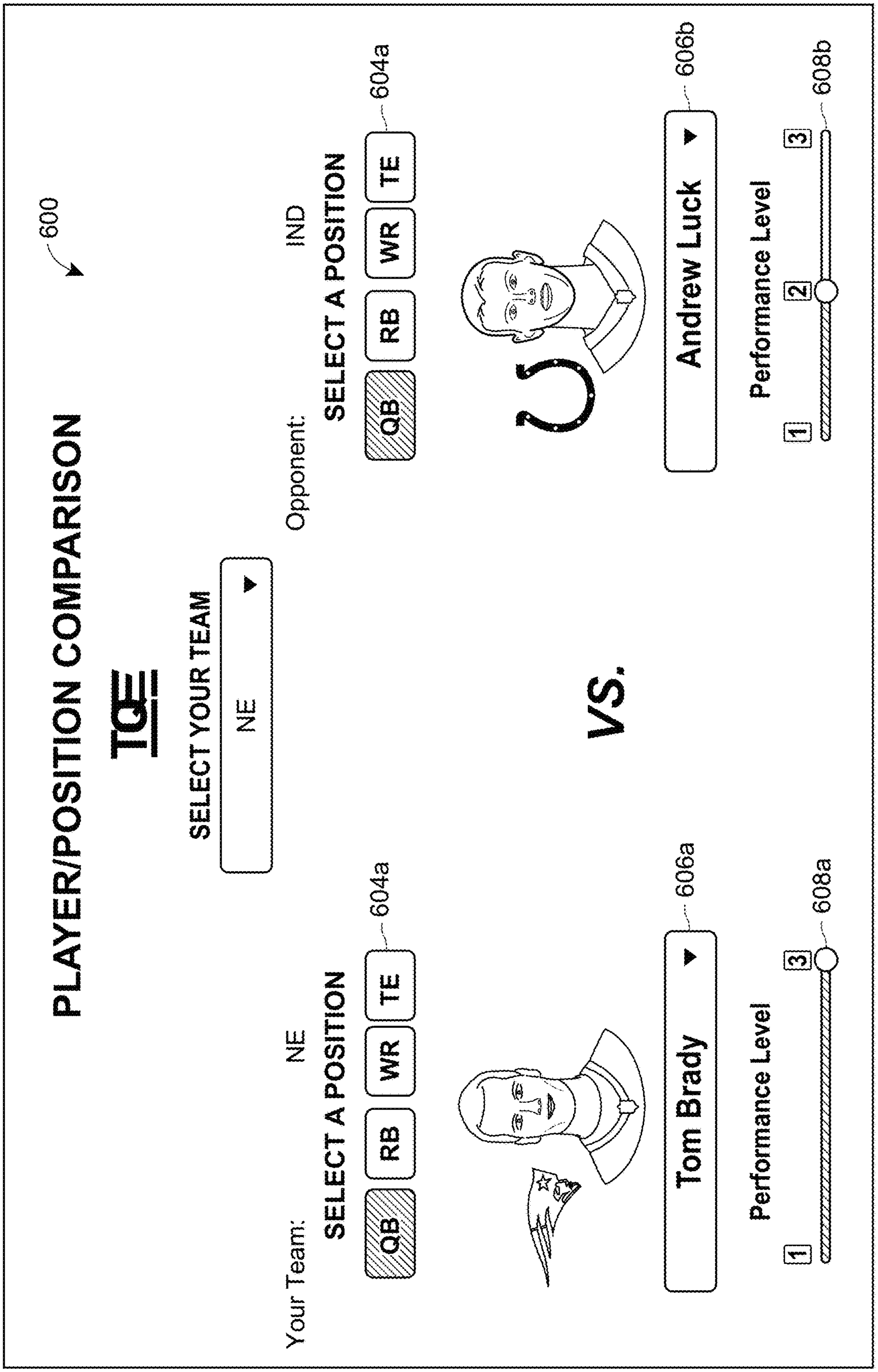
FIG. 6A is an example user interface presented by a client device interacting with user-directed prediction interface of the analytics platform, the user interface for viewing and controlling a performance level of a player in an upcoming event.
Figure 6B:
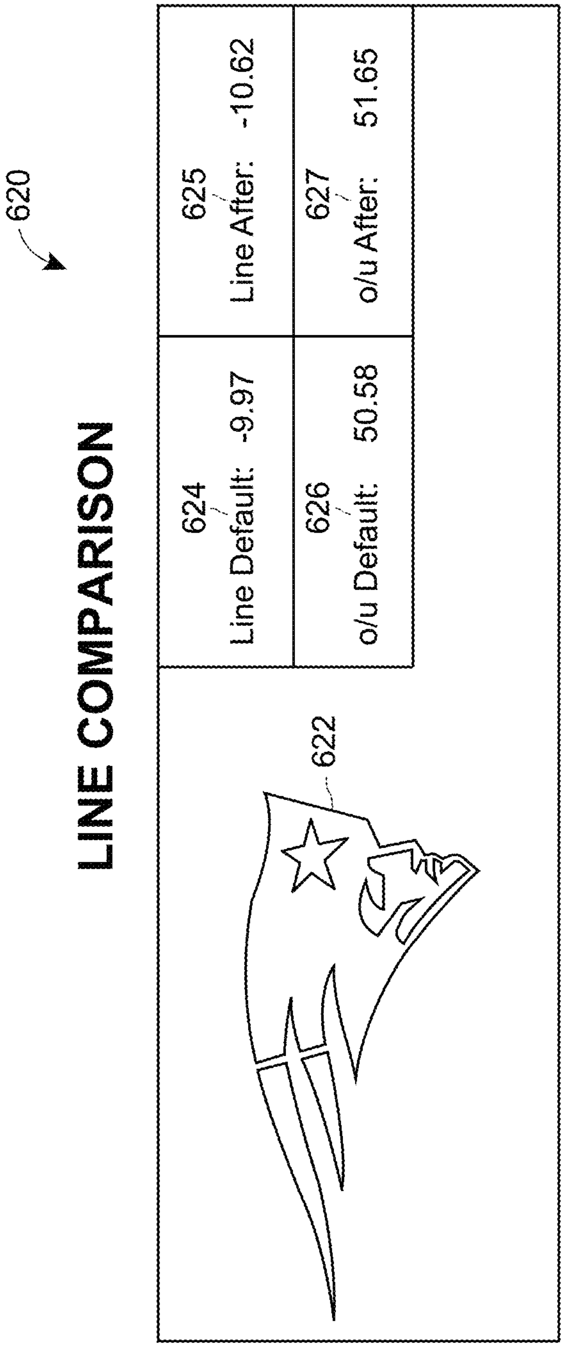
FIG. 6B is an example user interface presented by a client device interacting with a user-directed prediction interface of the analytics platform, the user interface for viewing the impact of the user controlled performance levels.

Turning now to FIGS. 6A-6B, illustrated are example user interfaces presented by the client device 105 interacting with a user-directed prediction tool of the plurality of tools 125 supported by the analytics platform 115. It should be appreciated that the layouts of the example user interfaces are controlled by a user interface template generated by the UI application 121 and the specific information displayed by the example user interfaces are obtained and/or generated by the update application 122.

FIG. 6A illustrates is an example user interface 600 for indicating an expected player performance level using the user-directed prediction tool supported by the analytics platform 115. The user-directed prediction tool enables the participant to select a particular team on which the participant is interested in wagering. As illustrated, the example user interface 600 includes a team selection element 602. The update application 122 monitors the team selection element 602 to identify the team selected by the participant. In response to detecting a selection, the update application 122 obtains a list of players associated with the selected team (as illustrated, the New England Patriots), as well as a team the selected team is competing against in an upcoming event (as illustrated, the Indianapolis Colts).

To select the particular players for which the participant wants to indicate a performance level, the example user interface 600 also includes position selection elements 604 and player selection elements 606. The update application 122 monitors the selections made via the position selection elements 604 to create a filtered list of players that match the selections. Accordingly, when the participant interacts with the player selection elements 606, the participant can select a player from the filtered list of players generated by the update application 122.

The example user interface 600 also provides prediction elements 608 that enable the participant to indicate a user-directed performance level for a particular player selected via the player selection elements 606. In the illustrated example, the participant may move a slider to select from three distinct performance levels. In other examples, the prediction elements 608 may include a drop down list, a dial, or any other type of user interface element that enables the participant to indicate a predicted performance level from any number of performance levels. For example, instead of, say 3 or 5 qualitative performance levels, the prediction elements 608 may enable the selection of a performance level on a scale from 0-100.

FIG. 6B is another example user interface 620 presented by the user-directed prediction tool supported by the analytics platform 115. The example user interface 620 enables the participant to view the impact of the selections made via the prediction elements 608 on the predicted event outcome. More particularly, the update application 122 monitors any selections made using the prediction elements 608 to calculate the predicted event outcomes based upon the current selections.

In response, the example user interface 620 includes one or more indications of an expected event outcome, such as an indication 622 of the team predicted to win the event. As another example, the example user interface 620 includes an indication of how the user-directed predictions impacted one or more outcomes of the event. In the illustrated example, the outcomes include the line (the amount by which the favored team is predicted to win, sometime referred to as the "spread") and the over/under (the total amount of points predicted to be scored by each team). More particularly, element 624 indicates the original line (such as the Vegas line) and element 625 indicates the line as adjusted based on the user-directed predictions made via the prediction elements 608. Similarly, element 626 indicates the original over/under (such as the Vegas over/under) and element 627 indicates the over/under as adjusted based on the user-directed predictions made via the prediction elements 608.

Figure 7:
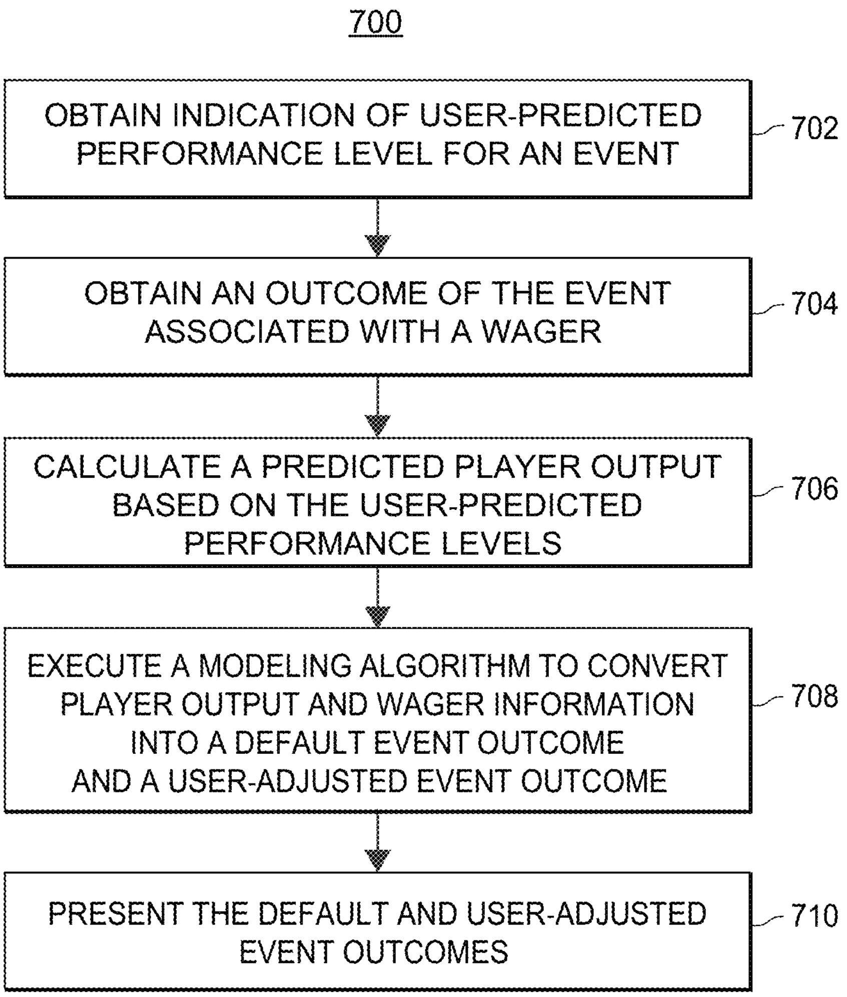
FIG. 7 is an example flow diagram for predicting event outcomes using a user-directed prediction tool of the analytics platform of FIG. 1A.

FIG. 7 is an example flow diagram for a method 700 for predicting event outcomes using a user-directed prediction tool of the plurality of tools 125 of the analytics platform 115. The method 700 may be executed, in part, by the update application 122 in conjunction with the user-directed prediction tool in response to detecting a user input selecting a performance level for a player via the element 608 of the user interface 600.

Accordingly, the method 700 begins by obtaining, via a user interface (such as the user interface 600) presented by the analytics platform 115, an indication of a user-directed performance level for a player participating in an event (block 702). In some embodiments, the update application 122 obtains a plurality of indications of respective user-directed performance levels for a plurality of players competing in the event. To this end, the update application 122 may detect that the participant indicated a predicted performance level for any number of players on any team competing in the event. It should be appreciated that if the update application 122 does not detect a user-directed performance level for a particular player competing in the event, the update application 122 may default the performance level to a median performance level.

At block 704, the method 700 includes obtaining, by the analytics platform 115, an outcome of the event associated with a wager. For example, the outcome associated with the wager may be a line, an over/under, a prop bet, or any other wager offered by a sports book. In some embodiments, the outcome associated with the wager is obtained from one or more data sources 117 maintained by respective gaming servers 113. In embodiments where different gaming server 113 associate different outcomes with the same wager, the analytics platform 115 may average or otherwise combine the different outcomes to generate the obtained outcome associated with the wager.

At block 706, the method 700 includes calculating, by the analytics platform 115, a predicted player output based on the player performing at the user-directed performance level. In one embodiment, the predicted player output is a projected amount of fantasy points the player will accrue during the event. In another embodiment, the predicted player output is an amount of points contributed to the teams overall points. In either embodiment, to calculate the predicted player output, the update application 122 utilizes a model of player performance for a plurality of players competing in the event.

More particularly, the analytics platform 115 models historical performances of a plurality of players at the same position as the player using a distribution function (such as a normal distribution function, a chi-squared distribution function, or any other probability density function). For example, if the player is a quarterback, the analytics platform 115 may generate a distribution function based on a plurality of past quarterback performances. Generally, the analytics platform 115 models each position that is selectable via the position selection elements 604 of the user interface 600. It should be appreciated that because the models are not dependent on any user input, the analytics platform 115 may generate and store the models prior to the participant interacting with the user-directed prediction tool. In these scenarios, the update application 122 may obtain and/or access the models previously generated by the analytics platform 115.

In some embodiments, the analytics platform 115 models each position based on player tier. That is, the analytics platform 115 may divide the player base into different classifications of players (e.g., top third, middle third, and lower third, or top quartile and remaining players, or any other classification) and generate a model specific to each player classification for that position. In these embodiments, update application 122 determines the classification for the particular player to utilize the appropriate model for the particular player.

Additionally or alternatively, in embodiments where the predicted player output corresponds to a projected amount of fantasy points, the analytics platform 115 may generate a model for each position (and/or classification thereof) based on any fantasy point scoring system. In some embodiments, the fantasy point scoring system is a standardized scoring system (such as one utilized by DraftKings, FanDuel, ESPN, Yahoo, or CBS). In other embodiments, the fantasy point scoring system is a customized scoring system obtained from the participant. In these embodiments, the analytics platform 115 may generate the customized models in response to receiving the customized scoring system. Additionally, to avoid re-generating the models each time the participant utilizes the user-directed prediction tool, the analytics platform 115 may associate the customized models with an account of the participant.

After the models are obtained, the update application 122 determines the projected player output based on the user-directed performance levels. In some embodiments, to determine the projected player output, the update application 122 determines a percentile associated with the user-directed performance level and calculates the value of the distribution function at the determined percentile. For example, if there are three possible performance levels, then the lowest may correspond to 0.25, the middle may correspond to 0.5, and the highest may correspond to 0.75. Thus, in these embodiments, the projected player output may be determine with relatively little processing power. As a result, the analytics platform 115 is capable of quickly producing a prediction.

In other embodiments, to produce a more accurate prediction, the update application 122 instead determines a percentile range associated with the user-directed performance level. For example, in the three performance level scenario, the lowest performance level may be 0.10-0.3, the middle performance level may be 0.3-0.7, and the upper performance level may be 0.7-0.9. Accordingly, the update application 122 then generates the projected player output in the form of a truncated distribution function corresponding to the percentile range indicated by the user-directed performance level for the player.

At block 708, the method 700 includes executing, by the analytics platform 115, a modeling algorithm configured to convert the outcome associated with the wager and the predicted player output into a default event outcome and a user-adjusted event outcome. Accordingly, the modeling algorithm may be configured to accept as an input, a team performance function. By defining the individual player's distribution function to be $x_{i_k}^{j}$, where k is a player index on the team and j is an indication of performance level, the team's performance function P is defined as $f(x_{i_1}^{j_1}, x_{i_2}^{j_2}, \ldots, x_{i_N}^{j_N})$ where N is the number of players on the team. Using the team performance function for each team competing in the event, the update application 122 determines a probability function for one or more event outcomes. For example, the probability function for the line outcome ($P_{line}$) is $P_B-P_A$, and the probability function for the over/under outcome ($P_{ou}$) is $P_B+P_A$.

The update application 122 then executes a regression model on the event outcome probability functions to determine the predicted event outcomes. For example, if the analytics platform 115 implements a linear regression model, the model may take the form of $outcome_{pred}=\varepsilon+\beta_1 v_{outcome}+\beta_2 P_{outcome}$, where c is the interception of the model, $v_{outcome}$ is the outcome of the event obtained at block 704, $\beta_1$ is the coefficient of the obtained outcome line, $P_{outcome}$ is the probability function for the particular event outcome, and $\beta_2$ is the coefficient of the prediction line. In some embodiments, the update application 122 executes the linear regression model for a plurality of simulations (e.g., 100, 500, 1000, 5000) to determine a most likely outcome. In some embodiments, the update application 122 implements Monte Carlo sampling techniques to randomly determine values in accordance with each player's truncated distribution function.

In embodiments, where the truncated probability functions correspond to a player's projected amount of fantasy points, the update application 122 converts the projected amount of fantasy points to an amount of points contributed by the player to a projected total of points scored by the player's team. In one example, the update application 122 determines a participation rate for the player to determine the player's impact on team performance. Accordingly, if a participant indicates that a bench player will have a very strong performance, due to the relatively small participation rate for bench players, the user-directed indication has a relatively small impact on the team performance.

To generate the predicted default event outcome, the update application 122 executes the regression model where each player is set to the median performance level, i.e., the team performance function is $f(x_{i_1}^{0}, x_{i_2}^{0}, \ldots, x_{i_N}^{0})$, assuming that 0 is the median performance level. Similarly, to generate the user-adjusted event outcome, the update application 122 executes the regression model based on the user-directed performance levels, i.e., the team performance function is $f(x_{i_1}^{j_1}, x_{i_2}^{j_2}, \ldots, x_{i_N}^{j_N})$, where $j_k$ is the user-directed performance level for the player $x_{i_k}$.

At block 710, the method 700 includes presenting, via a user interface generated by the analytics platform 115 (such as the user interface 620), the default event outcome and the user-adjusted event outcome. In one example, the default event outcome is presented via the element 624 of the user interface 620 and the user-adjusted event outcome is presented via the element 625 of the user interface 620.

In some embodiments, the method 700 may include identifying, by the analytics platform 115, one or more gaming servers 113 that support the wager on the event. For example, the identified gaming servers 113 may be the gaming servers 113 from which the event outcome was obtained at block 704. Based on the user-adjusted event outcome, the analytics platform 115 may compare the wagers offered by the gaming servers 113 to determine the particular gaming server 113 that offers the optimal wager on the event. For example, if the user-adjusted event outcome indicates an over/under of 50.5 and the default over/under is 42, the various gaming servers 113 may offer different odds on an over wager at 50. Thus, the optimal gaming server 113 may be determined by identifying the gaming server 113 that offers the best odds on a particular wager that complies with user-adjusted event outcome. After identifying the particular gaming server 113 and in response to a user interaction with the analytics platform 115, the analytics platform 115 may then interact with the particular gaming server 113 to place the wager with the particular gaming server 113.

It should be appreciated that the foregoing describes several examples that particularly relate to fantasy football games. However, these techniques and computer architectures are applicable to other types of games, such as fantasy baseball, hockey, soccer, basketball, and so on, as well as online wagering games.

Additionally, when implemented in software, any of the applications and tools described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

What is claimed:

1. A computer-implemented method comprising:

ingesting, by an analytics platform, data from a plurality of data sources into a database;

detecting, by the analytics platform, an instruction to launch a tool supported by the analytics platform, wherein the tool is a receiver-defender matchup analysis tool;

generating, by the analytics platform, a user interface template for presenting a user interface associated with the tool, the user interface template including an indication of a data table to present via the user interface;

based on an analysis of data stored in the database, generating, by the analytics platform, a temporary data table that includes data values indicated by the user interface template;

populating, by the analytics platform, the user interface template with the data values included in the temporary data table to produce the user interface associated with the tool; and causing, by the analytics platform, a client device to present the populated user interface associated with the tool.

2. The computer-implemented method of claim 1, wherein the analytics platform further supports a head-to-head matchup analysis tool.

3. The computer-implemented method of claim 1, wherein the analytics platform further supports an injury analysis tool.

4. The computer-implemented method of claim 1, wherein detecting the instruction to launch the tool supported by the analytics platform comprises:

detecting, by the analytics platform, an indication that the participant selected a user interface element inserted into a website supported by a gaming server by an analytics application executing on the client device.

5. The computer-implemented method of claim 4, wherein:

the user interface element is associated with a particular player;

the indication that the participant selected the user interface element includes an indication of the particular player; and detecting the instruction to launch the tool causes the tool to launch in a state where the indicated player is pre-selected.

6. The computer-implemented method of claim 1, wherein detecting the instruction to launch the tool supported by the analytics platform comprises:

detecting, by the analytics platform, an indication that the participant selected a user interface element associated with another tool supported by the analytics platform.

7. The computer-implemented method of claim 6, wherein:

the user interface element is associated with a particular player;

the indication that the participant selected the user interface element includes an indication of the particular player; and detecting the instruction to launch the tool causes the tool to launch in a state where the indicated player is pre-selected.

8. The computer-implemented method of claim 1, further comprising:

detecting, by the analytics platform, that the tool has ceased execution; and deleting, by the analytics platform, the temporary data table.

9. A non-transitory storage medium storing computer-executable instructions that, when executed by one or more processors, cause the one or more processor to:

ingest data from a plurality of data sources into a database;

detect an instruction to launch a tool supported by the analytics platform, wherein the tool is a receiver-defender matchup analysis tool;

generate a user interface template for presenting a user interface associated with the tool, the user interface template including an indication of a data table to present via the user interface;

based on an analysis of data stored in the database, generate a temporary data table that includes data values indicated by the user interface template;

populate the user interface template with the data values included in the temporary data table to produce the user interface associated with the tool; and cause a client device to present the populated user interface associated with the tool.

10. The non-transitory storage medium of claim 9, wherein the analytics platform further supports a head-to-head matchup analysis tool.

11. The non-transitory storage medium of claim 9, wherein the analytics platform further supports an injury analysis tool.

12. The non-transitory storage medium of claim 9, wherein to detect the instruction to launch the tool supported by the analytics platform, the computer-executable instructions, when executed, cause the one or more processors to:

detect an indication that the participant selected a user interface element inserted into a website supported by a gaming server by an analytics application executing on the client device.

13. The non-transitory storage medium of claim 12, wherein:

the user interface element is associated with a particular player;

the indication that the participant selected the user interface element includes an indication of the particular player; and detecting the instruction to launch the tool causes the tool to launch in a state where the indicated player is pre-selected.

14. The non-transitory storage medium of claim 9, wherein to detect the instruction to launch the tool supported by the analytics platform, the computer-executable instructions, when executed, cause the one or more processors to:

detect an indication that the participant selected a user interface element associated with another tool supported by the analytics platform.

15. The non-transitory storage medium of claim 14, wherein:

the user interface element is associated with a particular player;

the indication that the participant selected the user interface element includes an indication of the particular player; and detecting the instruction to launch the tool causes the tool to launch in a state where the indicated player is pre-selected.

16. The non-transitory storage medium of claim 9, wherein the computer-executable instructions, when executed, cause the one or more processors to:

detect that the tool has ceased execution; and delete the temporary data table.

* * * * *